United States Patent
Ode

(10) Patent No.: US 9,345,037 B2
(45) Date of Patent: May 17, 2016

(54) WIRELESS COMMUNICATION SYSTEM ASSIGNING TERMINALS TO GROUP CORRESPONDING TO FREQUENCY BANDS

(75) Inventor: Takayoshi Ode, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 12/442,871

(22) Filed: Mar. 25, 2009

(65) Prior Publication Data

US 2010/0034108 A1 Feb. 11, 2010

Related U.S. Application Data

(63) Continuation of application No. PCT/JP2006/321879, filed on Nov. 1, 2006.

(51) Int. Cl.
| | |
|---|---|
| H04L 12/28 | (2006.01) |
| H04W 72/08 | (2009.01) |
| H04J 1/16 | (2006.01) |
| H04W 72/02 | (2009.01) |
| H04W 72/04 | (2009.01) |

(52) U.S. Cl.
CPC ............ H04W 72/085 (2013.01); *H04W 72/02* (2013.01); *H04W 72/042* (2013.01)

(58) Field of Classification Search
USPC .............. 455/62, 67.11, 452.1, 512; 370/252, 370/278, 329, 343, 430
See application file for complete search history.

(56) References Cited

U.S. PATENT DOCUMENTS

| | | | | |
|---|---|---|---|---|
| 5,504,939 | A * | 4/1996 | Mayrand et al. | 455/450 |
| 5,666,655 | A * | 9/1997 | Ishikawa et al. | 455/512 |
| 7,385,934 | B2 | 6/2008 | Uehara et al. | |
| 2002/0013149 | A1* | 1/2002 | Threadgill et al. | 455/427 |
| 2003/0064681 | A1 | 4/2003 | Uedo | |
| 2003/0128658 | A1* | 7/2003 | Walton | H04L 1/06 370/208 |
| 2003/0133457 | A1 | 7/2003 | Ono et al. | |

(Continued)

FOREIGN PATENT DOCUMENTS

| | | |
|---|---|---|
| CN | 1390065 | 1/2003 |
| CN | 1761182 | 4/2006 |

(Continued)

OTHER PUBLICATIONS

International Search Report for the corresponding International Application No. PCT/JP2006/321879; date of completion Feb. 8, 2007.

(Continued)

*Primary Examiner* — John Pezzlo
(74) *Attorney, Agent, or Firm* — Myers Wolin, LLC

(57) ABSTRACT

The terminal measures the wireless channel quality of each frequency band, and notifies the base station of the quality. The base station determines the frequency band to be used by the terminal on the basis of the notification from the terminal. Then, the terminal is grouped depending on the difference etc. in frequency band in operating the terminal, and notified which terminal group the terminal belongs. Upon receipt of the notification from the base station, the terminal sets its own available frequency band and terminal group, and measures the notified wireless channel quality of the available frequency band. The measurement result is notified to the base station. The base station perform a scheduling process for each available frequency band on the basis of the wireless channel quality of the available frequency band of the terminal, and starts communicating with the terminal.

19 Claims, 30 Drawing Sheets

(56) References Cited

U.S. PATENT DOCUMENTS

| | | | |
|---|---|---|---|
| 2004/0196801 A1* | 10/2004 | Hiramatsu | 370/328 |
| 2005/0128976 A1 | 6/2005 | Uehara et al. | |
| 2005/0128993 A1 | 6/2005 | Yu et al. | |
| 2005/0282551 A1 | 12/2005 | Tandai et al. | |
| 2006/0039318 A1* | 2/2006 | Oh et al. | 370/328 |
| 2007/0026810 A1* | 2/2007 | Love et al. | 455/67.11 |
| 2008/0123615 A1* | 5/2008 | Hoshino et al. | 370/343 |
| 2015/0085945 A1* | 3/2015 | Zhang et al. | 375/267 |

FOREIGN PATENT DOCUMENTS

| | | |
|---|---|---|
| JP | 08/065730 | 3/1996 |
| JP | 2001/036950 | 2/2001 |
| JP | 2001/333097 | 11/2001 |
| JP | 2003/111144 | 4/2003 |
| JP | 2003/209887 | 7/2003 |
| JP | 2003-234715 | 8/2003 |
| JP | 2003/259437 | 9/2003 |
| JP | 2003/283471 | 10/2003 |
| JP | 2005/160079 | 6/2005 |
| JP | 2005/260992 | 9/2005 |
| JP | 2005/318434 | 11/2005 |
| JP | 2006-005672 | 1/2006 |
| JP | 2006/060814 | 3/2006 |
| JP | 2006/135440 | 5/2006 |
| WO | 02/09466 | 1/2002 |
| WO | 2005/096538 A1 | 10/2005 |
| WO | 2006/102744 A1 | 10/2006 |

OTHER PUBLICATIONS

Korean Intellectual Property Office, Notice of Preliminary Rejection issued for corresponding Korean Patent Application No. 10-2011-7002371, mailed Mar. 31, 2011. Full English translation attached.
Korean Intellectual Property Office, Second Notice of Preliminary Rejection issued for corresponding Korean Patent Application No. 10-2009-7008059, mailed Mar. 31, 2011. Full English translation attached.
Japanese Patent Office "Notice of Rejection Grounds" for corresponding Japanese Patent Application No. 2008-541962, mailed Jan. 18, 2011. Partial English translation attached.
Japanese Patent Office "Notice of Rejection Grounds" for corresponding Japanese Patent Application No. 2008-541962, mailed Aug. 16, 2011. Partial English translation attached.
The State Intellectual Property Office of China, "First Notification of Office Action" issued for corresponding Chinese Patent Application No. 200680056155.0, dated Jun. 24, 2011. English translation attached.
Extended European search report and the European search opinion issued for corresponding European Patent Application No. 06822808.9 dated Jun. 29, 2012.
Notice of Rejection Ground issued for corresponding Japanese Patent Application No. 2011-228020, mailed Feb. 18, 2014, with an English translation.
Sharp, "Monitoring of Paging Information for Evolved UTRA Scalable Bandwidth", Agenda Item: 8.2, Nov. 7-11, 2005, R1-051340, 3GPP TSG RAN WG1 #43, Seoul, Korea.
NEC Group et al, "Scalable band width & Physical channel mapping for L1/L2 control channel", Agenda Item: 13.1.3, Feb. 13-17, 2006, R1-060601, 3GPP TSG-RAN WG1 Meeting #44, Denver, USA.
NTT DOCOMO et al., "L1/L2 Control Channel Structure for E-UTRA Uplink", Agenda Item: 13.2.2.3, Feb. 13-17, 2006, R1-060320, 3GPP TSG-RAN WG1 Meeting #44, Denver, USA.
NEC Group, "Scalable bandwidth and UE capability", Agenda Item: 13.1.3, Feb. 13-17, 2006, R1-060602, 3GPP TSG-RAN WG1 Meeting #44, Denver, USA.
First Office Action issued for corresponding Indian Patent Application No. 1656/KOLNP/2009, dated Apr. 28, 2014.
Office Action issued for corresponding Canadian Patent Application No. 2,667,232, dated May 3, 2013.
Office Action issue by the Canadian Intellectual Property Office on Jul. 8, 2014, for corresponding Canadian Patent Application No. 2,667,232.
Office Action issued for corresponding European Patent Application No. 06822808.9, dated Aug. 21, 2013.
Decision of Rejection issued for corresponding Chinese Patent Application No. 200680056155.0, issued Sep. 2, 2013, with English translation.
Notice of Rejection Ground issued for corresponding Japanese Patent Application No. 2011-228020, mailed Jul. 2, 2013, with full English translation.
Extended European Search Report issued for corresponding European Patent Application No. 13153339.0, dated Aug. 22, 2013.
4th Notification of Office Action issued for corresponding Chinese Patent Application No. 200680056155.0, issued Apr. 3, 2013, with an English translation.
Decision of Rejection issued for corresponding Japanese patent application No. 2011-228020, mailed on Nov. 18, 2014, with an English translation.
European Office Action issued for corresponding European Application No. 06 822 808.9 mailed on Jun. 3, 2015.
Reexamination Notice issued for corresponding Chinese Application No. 200680056155.0 mailed on Oct. 22, 2015 with full English translation.
Office Action issued for corresponding Canadian Patent Application No. 2,667,232 mailed on Feb. 10, 2016.

* cited by examiner

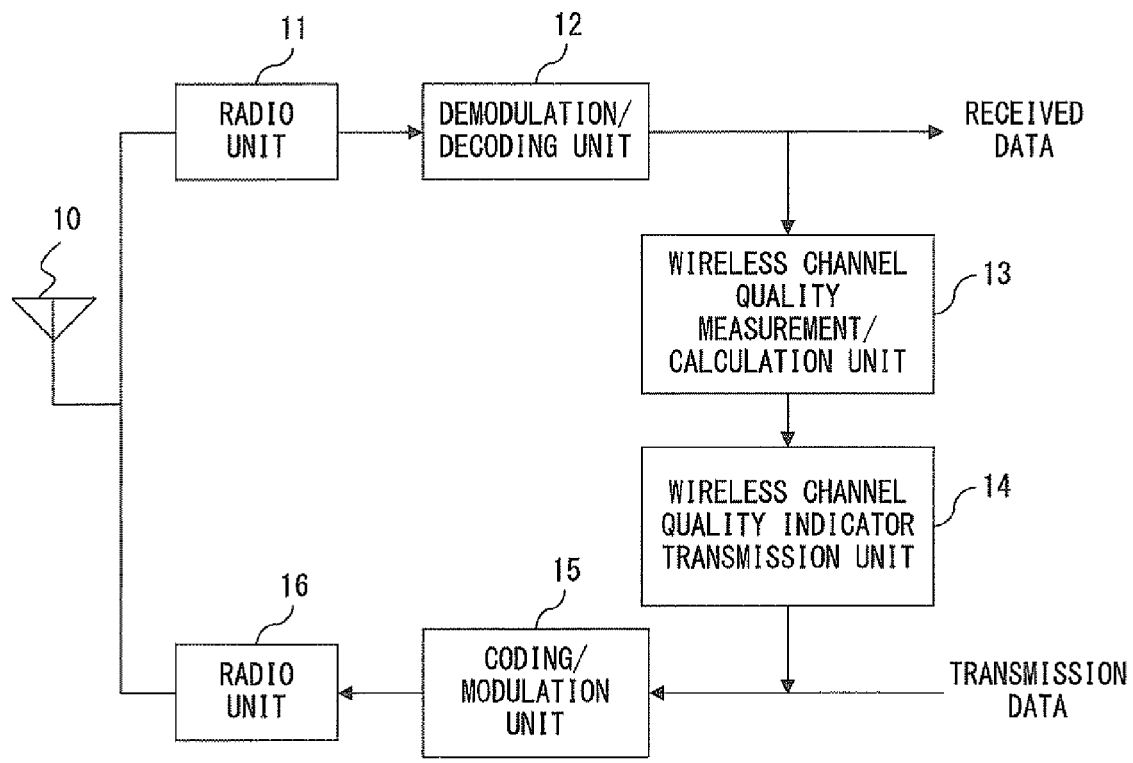
F I G. 1

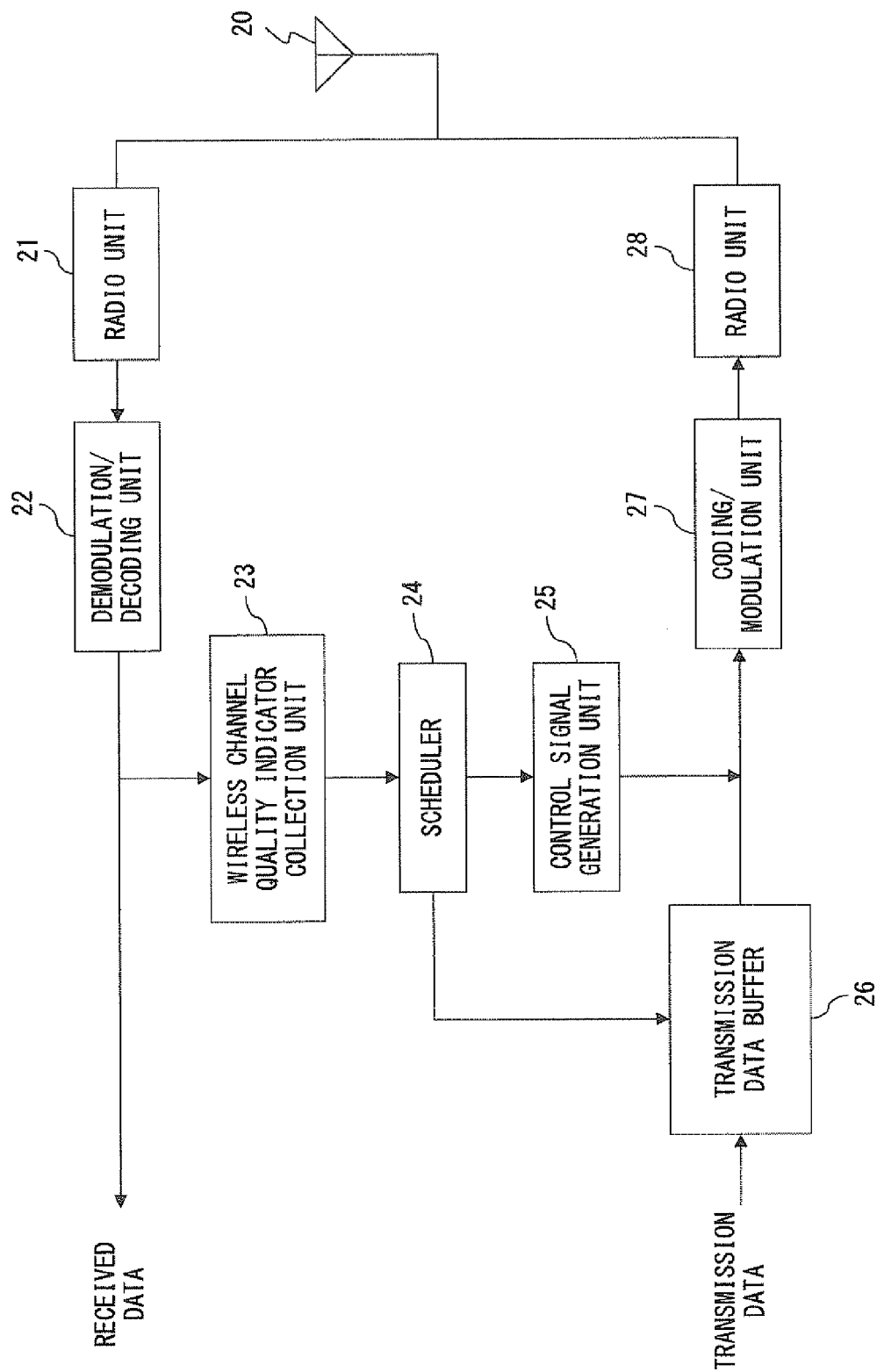
F I G. 2

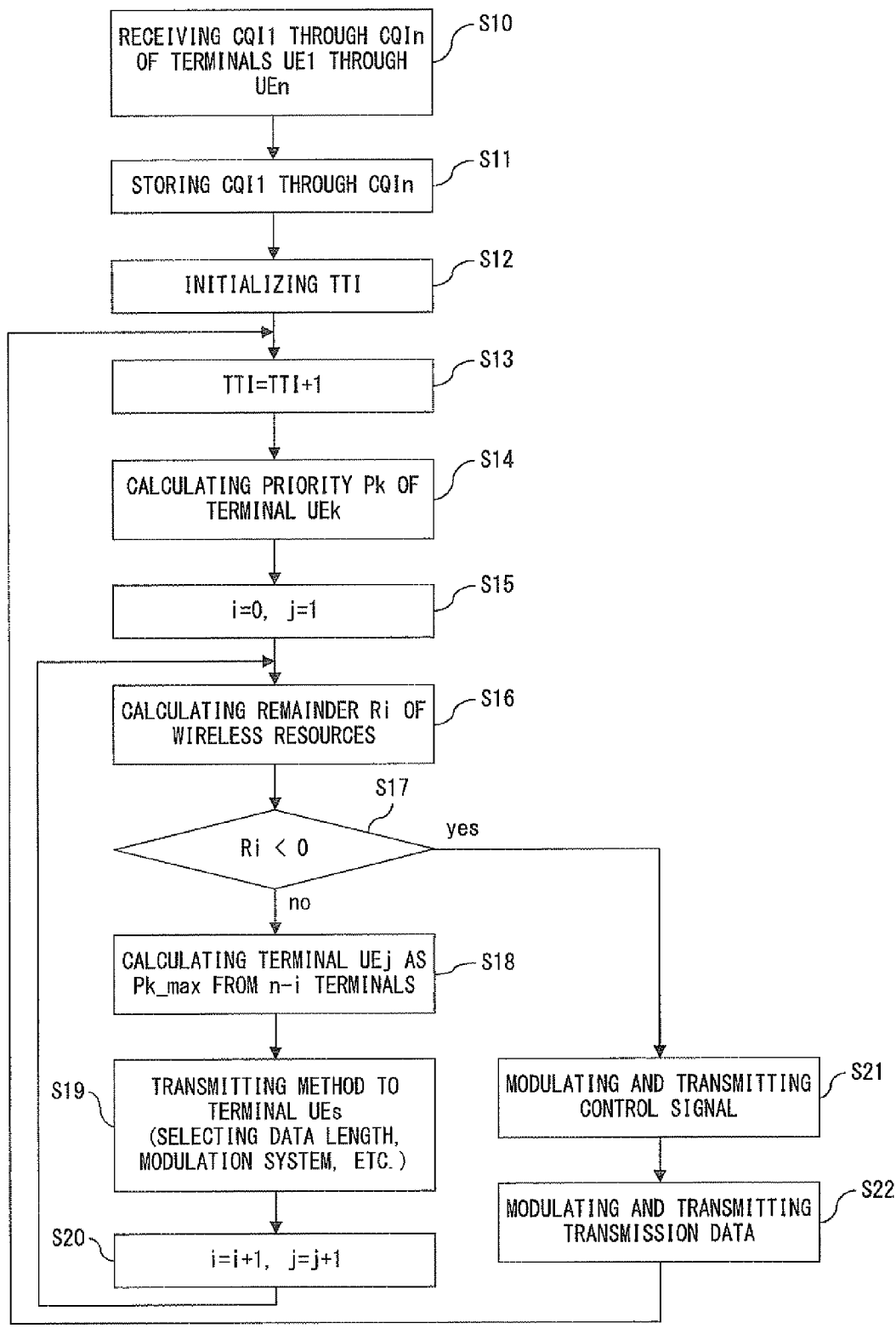
F I G. 3

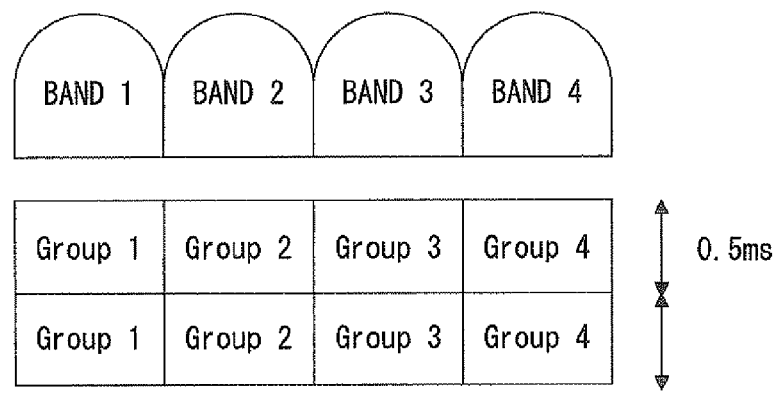
(a)
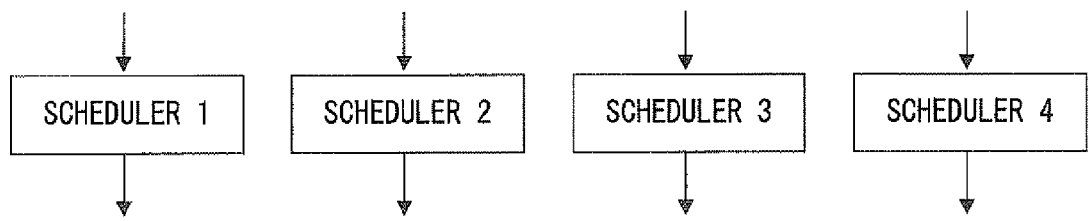
(b)
FIG. 10

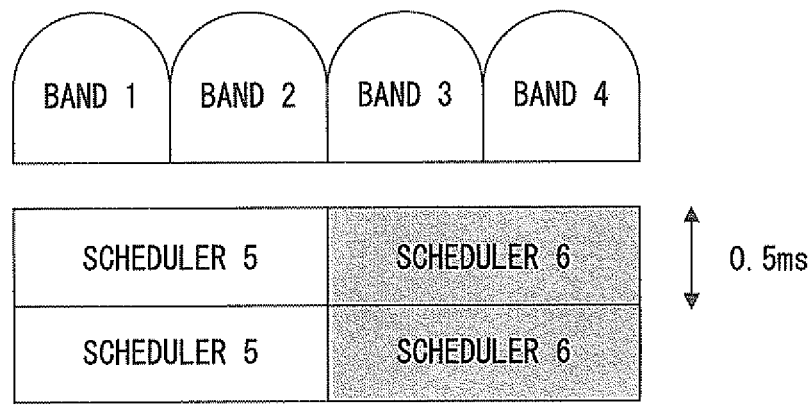
F I G. 1 1

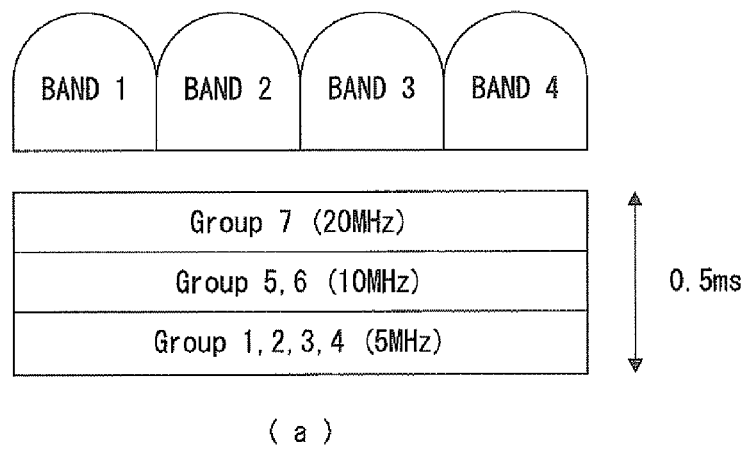
( a )
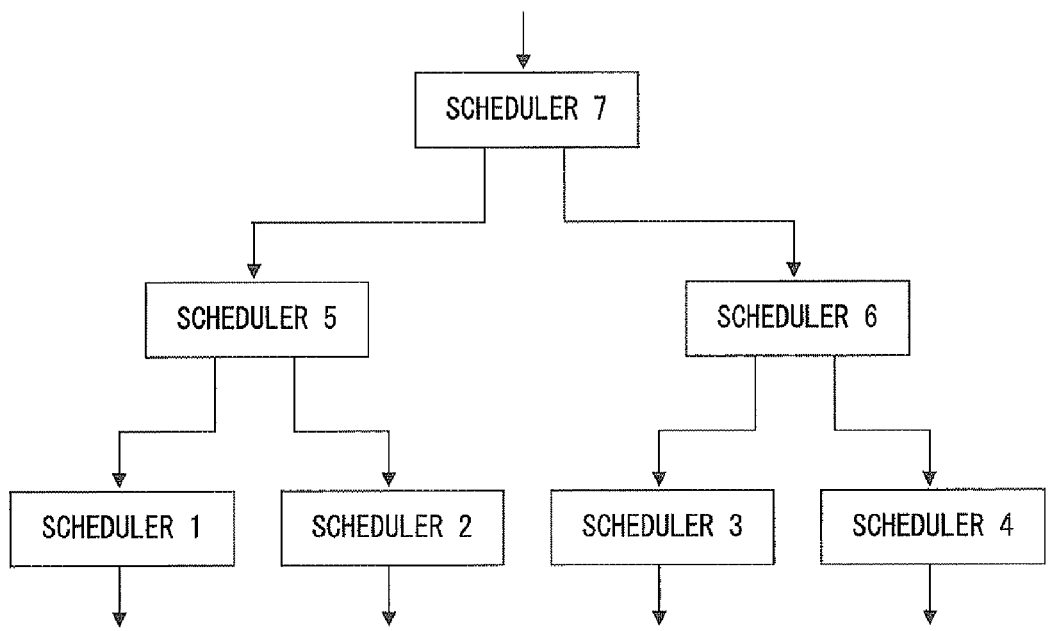
( b )
FIG. 13

| TERMINAL GROUP NUMBER | CENTRAL FREQUENCY | BAND [MHz] | TERMINAL | |
|---|---|---|---|---|
| 1 | f1 | 5 | UE100, UE101, ......, | UE108, UE109 |
| 2 | f2 | 5 | UE110, UE111, ......, | UE118, UE119 |
| 3 | f3 | 5 | UE120, UE121, ......, | UE128, UE129 |
| 4 | f4 | 5 | UE130, UE131, ......, | UE138, UE139 |
| 5 | f5=((f1+f2)/2) | 10 | UE140, UE141, ......, | UE148, UE149 |
| 6 | f6=((f3+f4)/2) | 10 | UE150, UE151, ......, | UE158, UE159 |
| 7 | f7=((f2+f3)/2) | 20 | UE160, UE161, ......, | UE168, UE169 |

FIG. 14

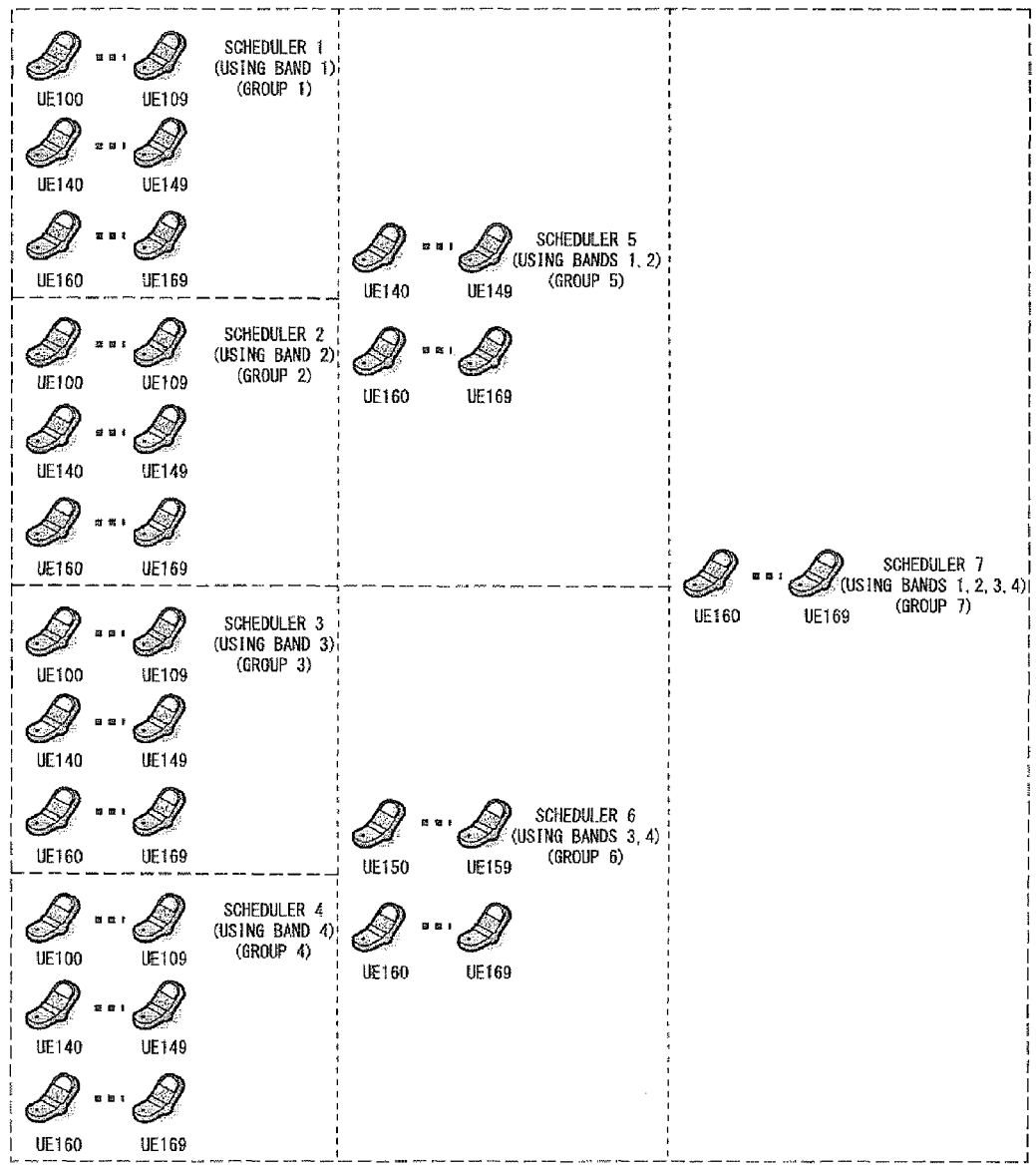
F I G. 15

| TERMINAL GROUP NUMBER | CENTRAL FREQUENCY | BAND [MHz] | TERMINAL | | |
|---|---|---|---|---|---|
| 1 | f1 | 5 | UE100, UE140, UE160, | UE101, UE141, UE161, | ..., ..., ..., | UE108, UE148, UE168, | UE109, UE149, UE169 |
| 2 | f2 | 5 | UE110, UE140, UE160, | UE111, UE141, UE161, | ..., ..., ..., | UE118, UE148, UE168, | UE119, UE149, UE169 |
| 3 | f3 | 5 | UE120, UE150, UE160, | UE121, UE151, UE161, | ..., ..., ..., | UE128, UE158, UE168, | UE129, UE159, UE169 |
| 4 | f4 | 5 | UE130, UE150, UE160, | UE131, UE151, UE161, | ..., ..., ..., | UE138, UE158, UE168, | UE139, UE159, UE169 |
| 5 | f5=((f1+f2)/2) | 10 | UE140, UE160, | UE141, UE161, | ..., ..., | UE148, UE168, | UE149, UE169 |
| 6 | f6=((f3+f4)/2) | 10 | UE150, UE160, | UE151, UE161, | ..., ..., | UE158, UE168, | UE159, UE169 |
| 7 | f7=((f2+f3)/2) | 20 | UE160, | UE161, | ..., | UE168, | UE169 |

FIG. 16

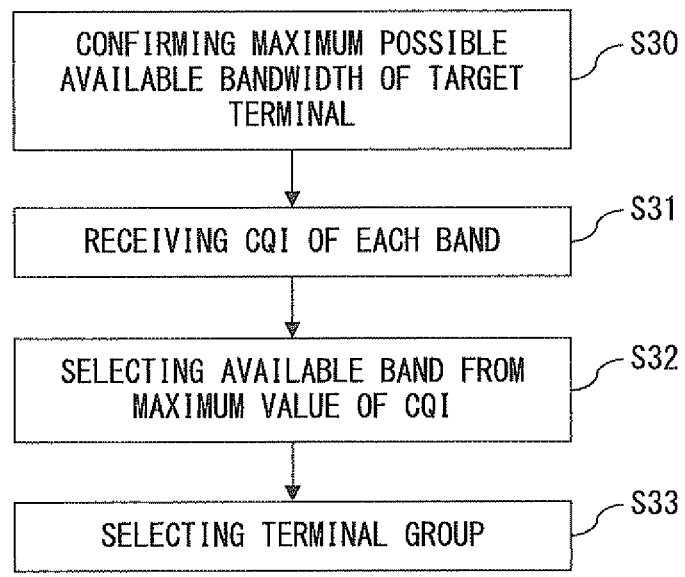
F I G. 17

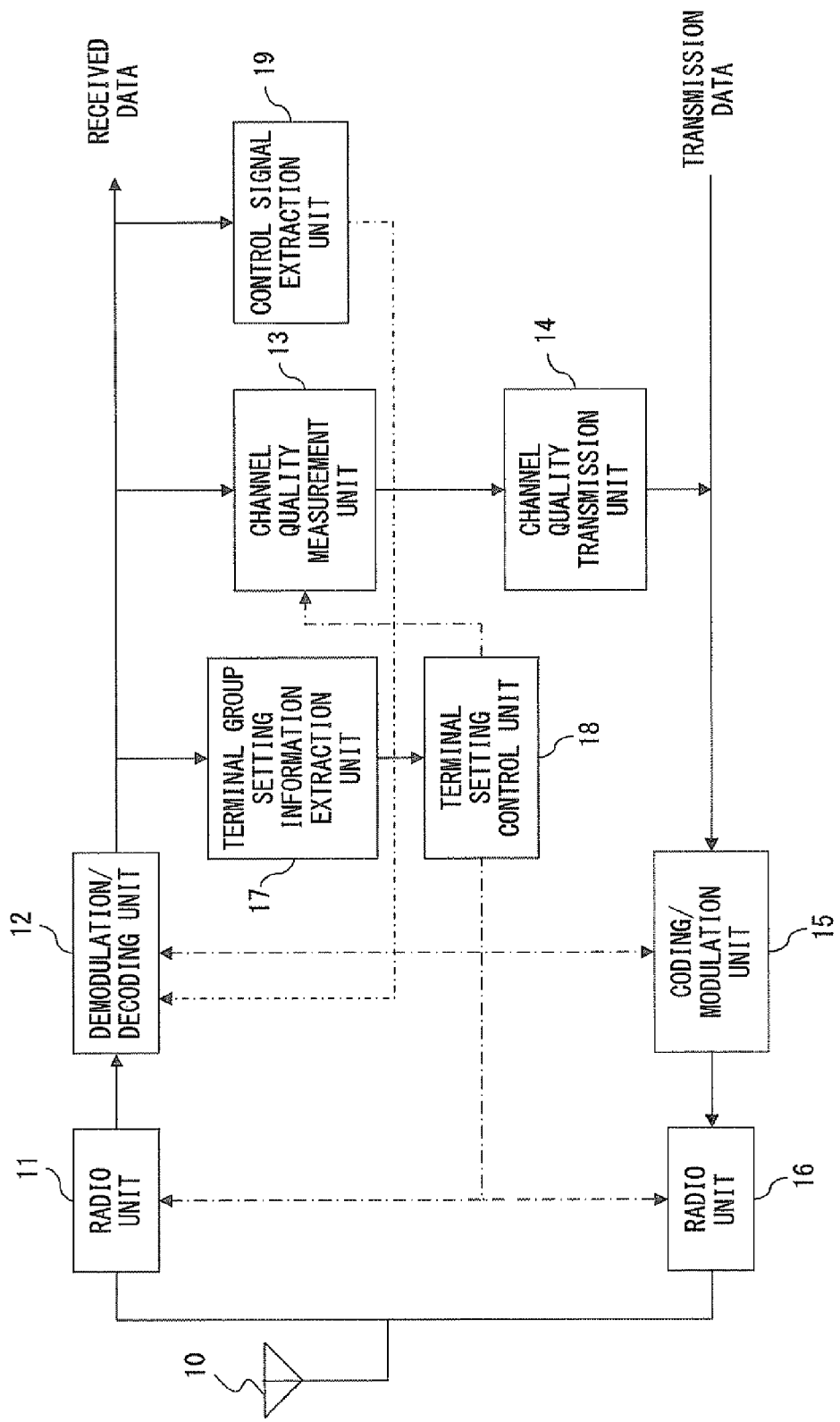
F I G. 2 2

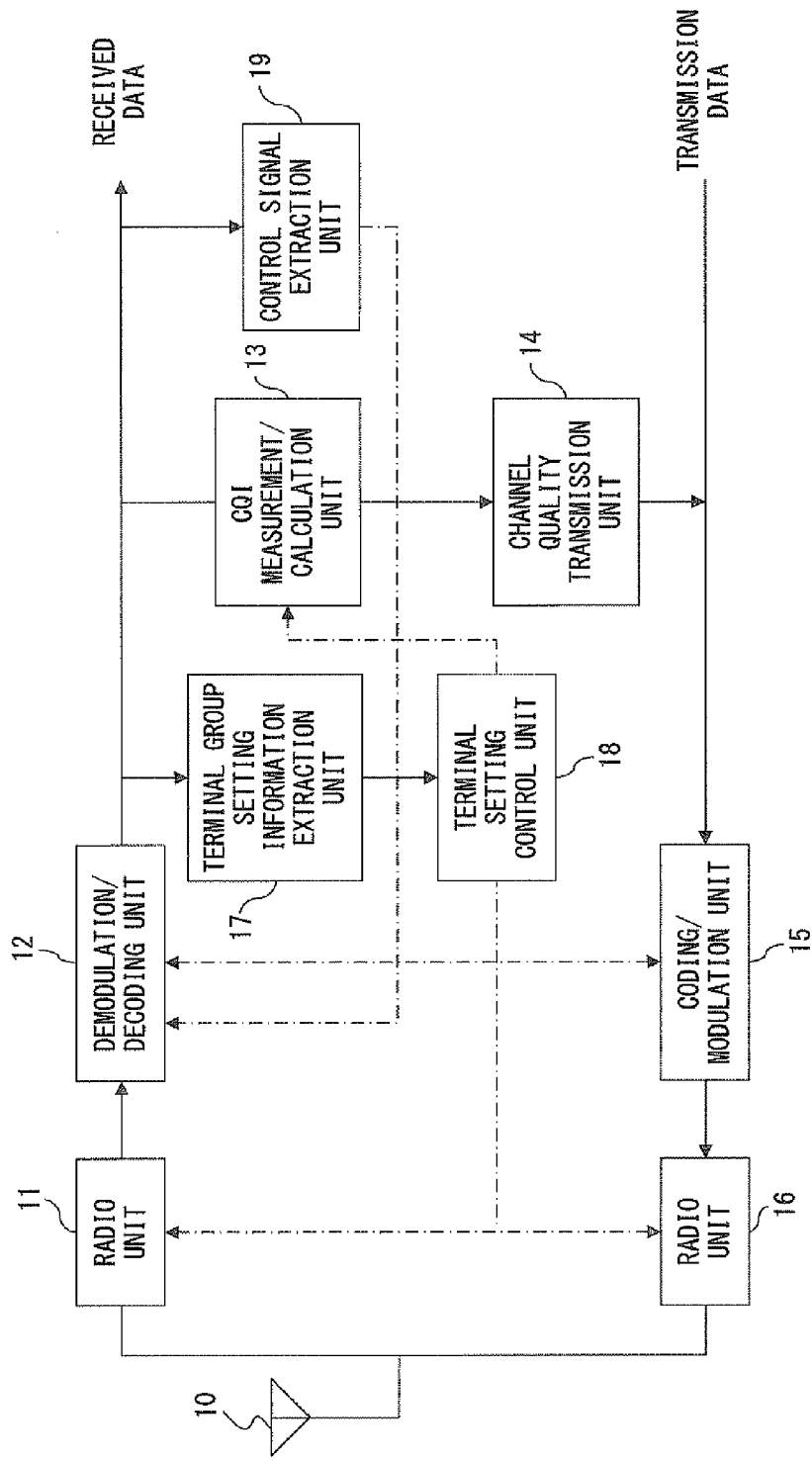
F I G. 2 4

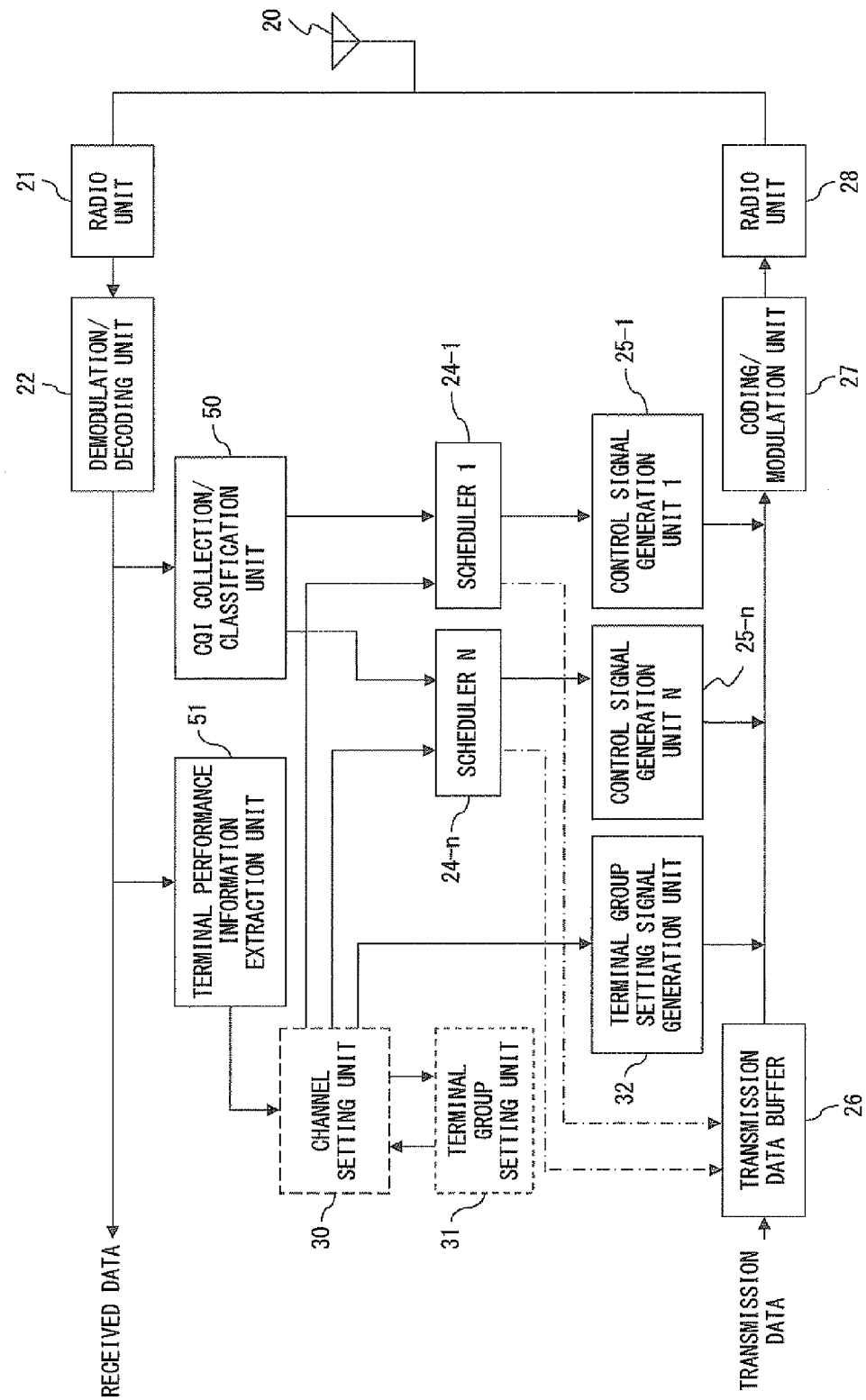
F I G. 27

WIRELESS COMMUNICATION SYSTEM ASSIGNING TERMINALS TO GROUP CORRESPONDING TO FREQUENCY BANDS

TECHNICAL FIELD

The present invention relates to a wireless communication system.

BACKGROUND ART

A mobile communication system for assigning transmission using a scheduler as an HSDPA system standardized in a 3GPP has been partially put to practical use.

Described below is an example of an HSDPA system for performing a high-speed downlink transmission using an example of the configuration of a terminal and an example of a configuration of a base station.

FIGS. 1 through 5 are explanatory views of a conventional HSDPA system.

In the terminal illustrated in FIG. 1, for example, a wireless channel quality measurement/calculation unit 13 measures and calculates a wireless channel quality indicator (hereinafter referred to as a CQI (channel quality indicator)) according to the pilot signal of a downlink signal received through an antenna 10, a radio unit 11, and a demodulation/decoding unit 12. As a practical example, an SIR is calculated by measuring the reception power and interference power of the pilot signal. The CQI value is assembled into a transmitting signal by a wireless channel quality indicator transmission unit 14, encoded and modulated by a coding/modulation unit 15, and transmitted to a base station on an uplink wireless channel through the antenna 10.

On the other hand, the base station illustrated in FIG. 2 receives a signal carrying the CQI value transmitted from a terminal through an antenna 20, a radio unit 21, and a demodulation/decoding unit 22, collects a wireless channel quality indicator (CQI), and notifies a scheduler 24 of the indicator. The scheduler 24 calculates the priority of the terminal for each available frequency band using the wireless channel quality indicator (hereinafter referred to as a CQI (channel quality indicator) reported from the terminal, and selects a transmission parameter on a higher priority basis. A control signal generation unit 25 generates a transmitting control signal, and transmits the signal to a terminal through a coding/modulation unit 27, a radio unit 28, and the antenna 20. The transmission data of a transmission data buffer 26 is transmitted to a terminal after the control signal is transmitted.

FIG. 3 is a flowchart of a scheduling process.

Assume that there are terminals UE1 through UEn in the cell of a base station. In step S10, the CQI values (CQI1 through CQIn) of the terminals UE1 through UEn are received. In step S11, the CQI1 through CQIn are stored. In step S12, a TTI is initialized. A TTI is short for a transmission time interval, and refers to a transmission interval of the data to a terminal. In this example, it is used as a variable indicating a transmission frequency. In step S13, the TTI is increased by 1. In step S14, the priority Pk of the terminal UEk is calculated. In step S15, the system is initialized to i=0, j=1. In step S16, the wireless resources Ri is calculated. With i=0, the wireless resources have not been assigned. Therefore, Ri refers to the entire wireless resources. In step S17, if is determined whether or not the wireless resources Ri is smaller than 0. If the determination in step S17 is YES, control is passed to step S21. If the determination in step S17 is NO, the terminal UEj having the priority Pk of the maximum value Pk_max is calculated from the n−i terminals in step S18. In step S19, the method of transmitting data (data length, modulation system, etc.) to the terminal UEj is selected. In step S20, i is increased by 1, j is increased by 1, and control is returned to step S16. In step S21, the transmitting method selected in step S19 is modulated as a control signal, and the result is transmitted to the terminal. In step S22, the transmission data is modulated for the terminal to which the control signal has been transmitted, transmits the result to the terminal, and control is returned to step S13.

As a method of calculating the priority, the MAX CIR method of selecting a larger CQI value, and the PF (proportional fairness) method of selecting a larger CQI and performing a selection for equal opportunity.

In the above-mentioned 3GPP, the specification of the E3G (evolved 3G) system is inspected as a next generation mobile communication system. In this respect, the implementation of the OFDMA system and the SC-FDMA system are studied respectively for downstream and upstream as a multi-connection method.

In addition, in the E3G system, a scheduling process is performed as with the HSDPA system using the frequency band broader than the conventional HSDPA (for example, four times). Furthermore, the terminal used in the E3G system has different bandwidths between upstream and downstream. Additionally, in the downstream, the available bands by terminals depend on each terminal, for example, 1.25 MHz, 2.5 MHz, 5 MHz, 10 MHz, 20 MHz, etc.

Therefore, it is necessary to perform a scheduling process at the system band of 20 MHz by considering the available bandwidth.

That is, as illustrated in FIG. 4, it is necessary to perform the scheduling process on the entire system using one scheduler.

Furthermore, assume that the downlink system bandwidth is 20 MHz, and the downlink bandwidth of a terminal is 5 MHz. At this time, the frequency used during operation is variable with the relationship with other terminals taken into account, and there are four options. Therefore, to allow the scheduler of a base station to select the optimum band from among a plurality of bands with the available bandwidths by other terminals taken into account, the CQI is measured and calculated for every 5 MHz band at a terminal as illustrated in FIG. 5, and the result is to be reported to the base station.

That is, four times as much as the measurement and calculation are required as compared with the HSDPA system. In addition, the frequency of reporting the CQIs to the base stations quadruples. As a result, the interference of the up-channel also quadruples.

In the E3G system, when the entire system is scheduled by one scheduler,
  When simply compared with the scheduler of the conventional HSDPA system, the number of terminals to be scheduled is multiplied (for example, quadrupled).
  As compared with the transmission interval of 2 msec of the conventional HSDPA system, the interval is ¼, that is, 0.5 msec.

For the two above-mentioned reasons, for example, 16 times scheduling speed as fast as the conventional system is demanded. That is, the priority calculation time is to be set to 1/16.

On the other hand, the improvement of the performance of the process of the CPU and the DSP for performing the scheduling process approximately quadruples on the basis of the reference of year 2010 as the target of starting the service of the E3G, which is far from the above-mentioned 16 times with the Moore's Law (double process speed in 18 months) taken into account.

Therefore, it is inevitable that the scheduling process is performed at a higher speed.

The patent document 1 discloses the technology of grouping and scheduling terminals moving at a high speed. Furthermore, it specifies the bands to be scheduled. It is assumed that they are based on the HSUPA (high speed uplink packet access) of the 3GPP. However, in the descriptions, a terminal moving at a low speed or during halts is not scheduled.

The patent document 2 discloses an example using an OFCDM (orthogonal frequency and code division multiplexing). That is, a spreading process is performed in the frequency and time directions, and then a multiplexing operation is performed.

The patent document 3 groups the terminals using the amount of attenuation of transmission power. Since there are no descriptions about available frequency bands, it is considered that the conventional OFDM is used.

The patent document 4 discloses a base station detecting the moving speed of a mobile station using a Doppler frequency, and optimally selecting a coding rate and a modulation system.

The patent document 5 discloses optimally determining the transmission rate of the communications of a mobile station and a base station according to the information about the Doppler frequency etc. of a mobile station.

The patent document 6 discloses grouping a subcarrier, acquiring channel quality information for each group, and transmitting and receiving the information.

Patent Document 1: Japanese Laid-open Patent Publication No. 2006-060814
Patent Document 2: Japanese Laid-open Patent Publication No. 2005-318434
Patent Document 3: Japanese Laid-open Patent Publication No. 2001-036950
Patent Document 4: Japanese Laid-open Patent Publication No. 2003-259437
Patent Document 5: Japanese Laid-open Patent Publication No. 2005-260992
Patent Document 6: Japanese Laid-open Patent Publication No. 2005-160079

DISCLOSURE OF THE INVENTION

The present invention aims at providing a wireless communication system capable of speeding up a scheduling process at a base station.

The wireless communication system according to the present invention having a base station communicating with a plurality of subordinate terminals using a plurality of frequency bands includes: a grouping device for assigning the plurality of terminals to a group of each of the frequency bands according to the wireless channel quality acquired for each frequency band used by a terminal in communicating with a base station; a scheduling device for scheduling the grouped terminal for each group; and a communication device for the base station communicating with a terminal according to a result of the scheduling.

BRIEF DESCRIPTION OF THE DRAWINGS

FIG. 1 is an explanatory view (1) of a conventional HSDPA system;
FIG. 2 is an explanatory view (2) of a conventional HSDPA system;
FIG. 3 is an explanatory view (3) of a conventional HSDPA system;
FIG. 10 is an explanatory view (2) of the method of grouping and scheduling a terminal;
FIG. 11 is an explanatory view of an image of grouping and scheduling methods when the available bandwidth of a terminal is different from that illustrated in FIG. 10;
FIG. 13 is an explanatory view (2) of a hierarchical grouping process;
FIG. 14 illustrates an example of a grouping table of a base station when a terminal is grouped;
FIG. 15 is an explanatory view of other grouping methods;
FIG. 16 illustrates an example of a grouping table of a base station for the grouping operation illustrated in FIG. 15;
FIG. 17 is a view (1) of an example of the process when a terminal is grouped;
FIG. 22 is a view of the configuration illustrating the principle of the terminal according to the present invention;
FIG. 24 illustrates an example of a configuration illustrated in FIG. 22 applied to a case when a CQI is measured as wireless channel quality;
FIG. 27 illustrates the third example of a configuration of a base station according to an embodiment of the present invention.

BEST MODE FOR CARRYING OUT THE INVENTION

Described below is a downlink transmission as an example.

Figure 4:
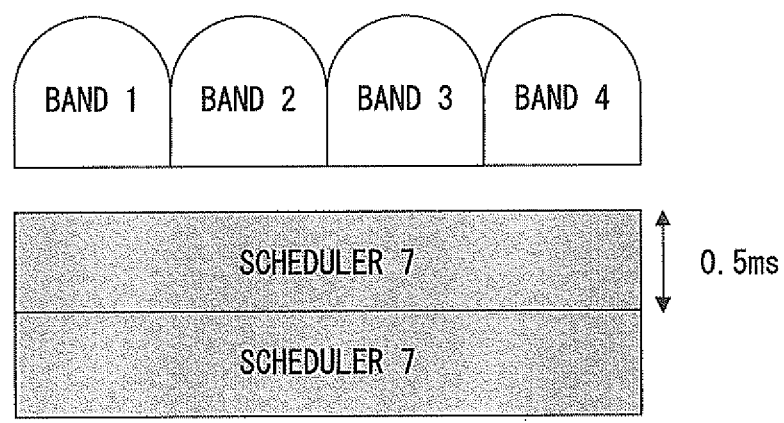
FIG. 4 is an explanatory view (4) of a conventional HSDPA system.
Figure 5:
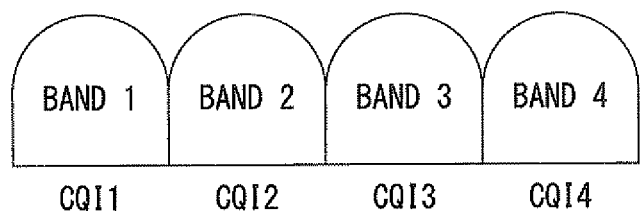
FIG. 5 is an explanatory view (5) of a conventional HSDPA system.
Figure 6:
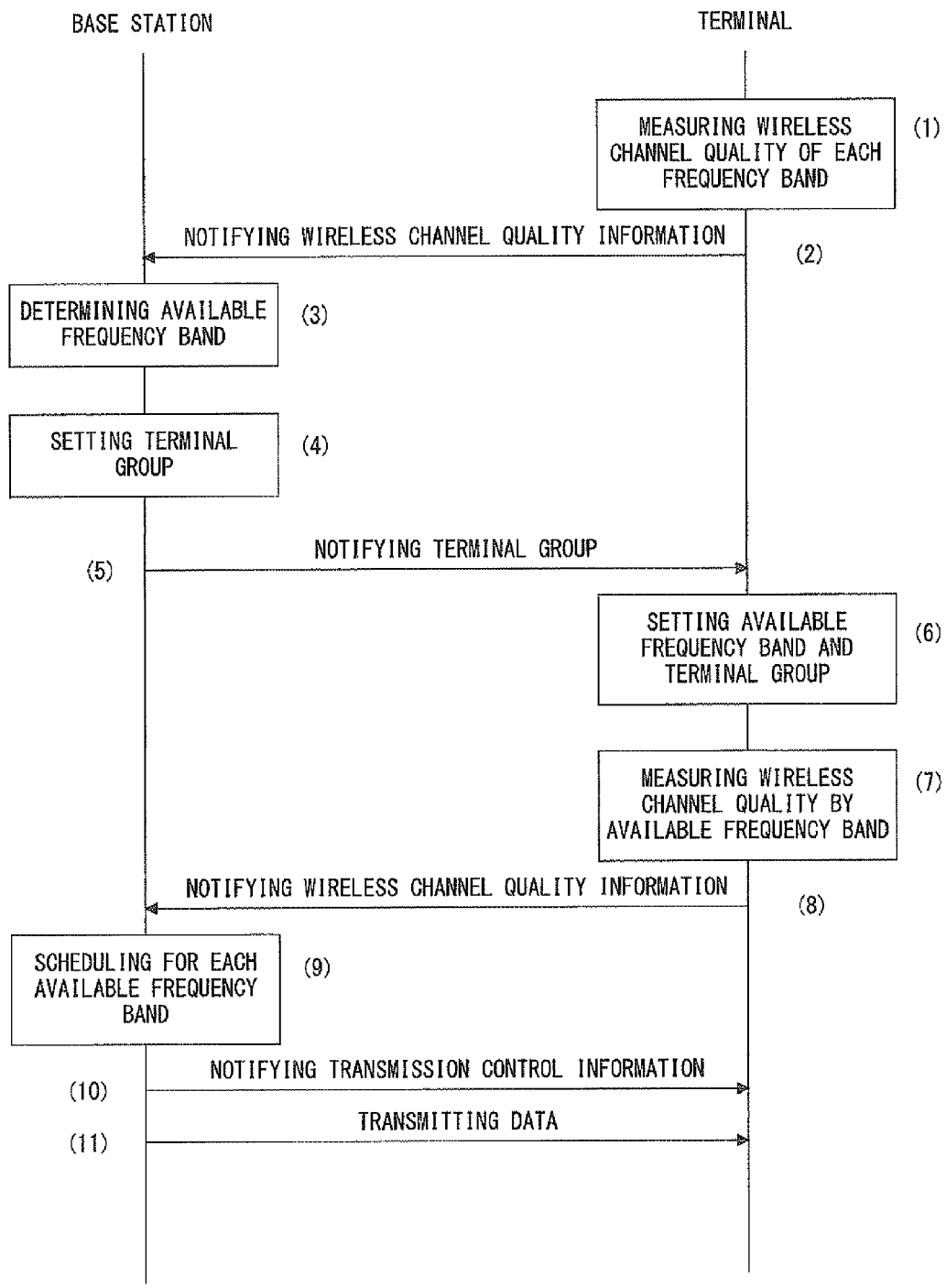
FIG. 6 is a sequence of the flow of the process according to an embodiment of the present invention.

FIG. 6 is a sequence of the flow of the process according to an embodiment of the present invention.

In FIG. 6, a terminal measures the wireless channel quality for each frequency band (1). That is, an SIR is calculated from received data, and a CQI value is obtained on the basis of the calculated SIR. The measured wireless channel quality is notified to a base station (2). The base station determines the available frequency band by the terminal from the information about the received wireless channel quality (3), and classifies all terminals that have transmitted the wireless channel quality into groups (4). When the grouping process is completed, the base station notifies each terminal of the terminal group to which the terminal belongs (5). Upon receipt of the terminal group notification, the terminal sets an available frequency band and the terminal group (6). The terminal measures the wireless channel quality at the available frequency bands set for the terminal (7), and notifies the base station of the measurement result (8). The base station performs a scheduling process for each available frequency band on the basis of the notified wireless channel quality. That is, the base station selects a technique for transmission on the basis of the priority of the terminal, and selects a transmitting method. Then, it generates control information to be received by the terminal (9), notifies the terminal of the transmission control information (10), and then transmits data (11).

Thus, in the OFDMA system and the MC-CDMA system, terminals are grouped depending on the possible available bandwidths and the available frequencies. The grouping process can be performed when a wireless channel is set, or can be performed at predetermined intervals after setting the wireless channel. The information for the grouping process can be a possible available bandwidth of a terminal, the channel quality of each band, the use of a channel (load) of each band, etc.

Figure 7:
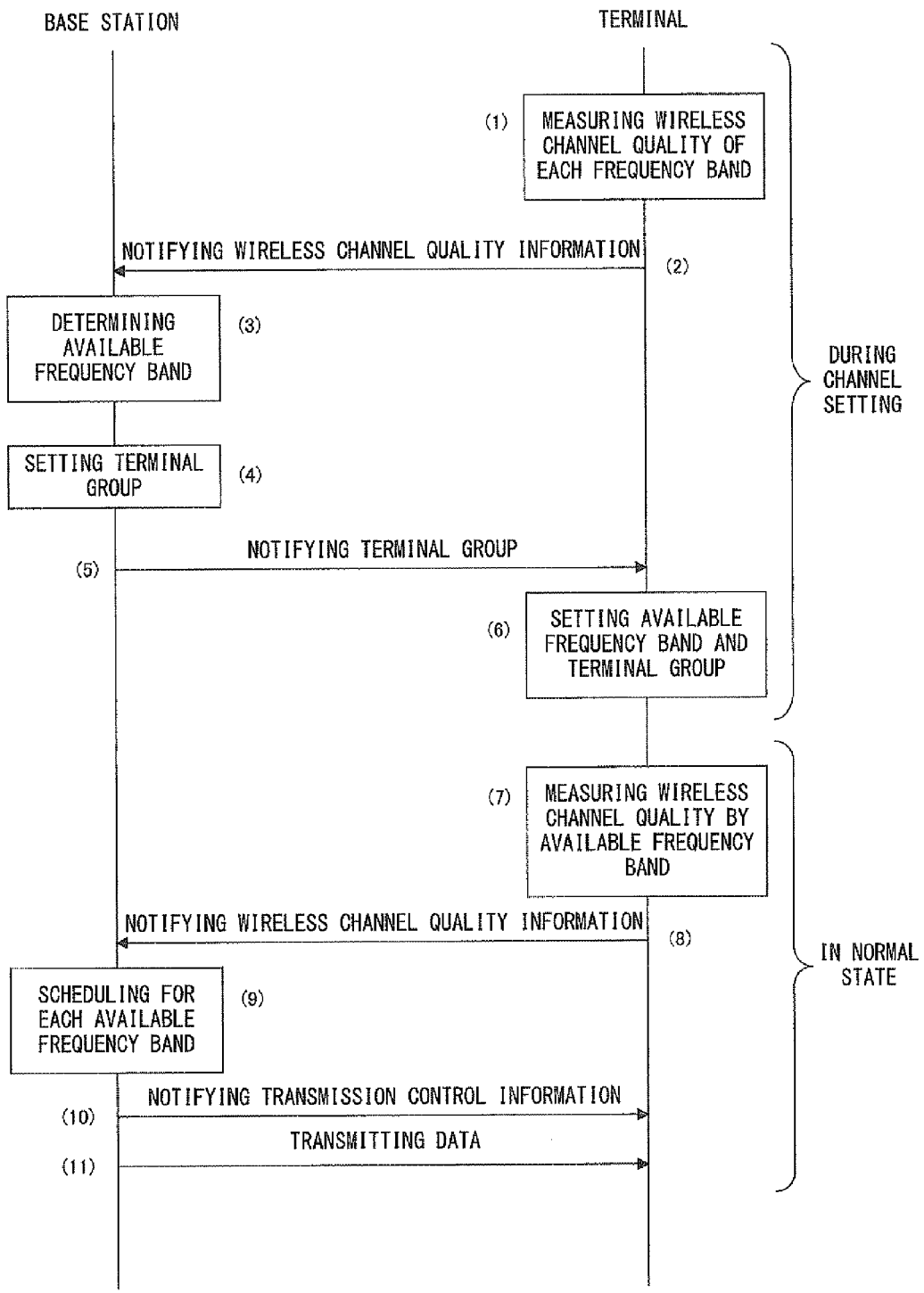
FIG. 7 is an explanatory view illustrating the case in which a grouping operation is performed in the easiest method on a basis of channel quality of each band during channel setting.

FIG. 7 is an explanatory view illustrating the case in which a grouping operation is performed in the easiest method on a basis of channel quality of each band during channel setting.

Practically, assume a case in which a terminal has the maximum possible available bandwidth of 5 MHz, and the bandwidth of the system of 20 MHz. When a characteristic is set, the terminal measures the wireless channel quality for each band obtained by dividing the system band of 20 MHz by the maximum possible available bandwidth of 5 MHz, calculates a wireless channel quality indicator (1), and notifies the base station of the calculated indicator (2). The base station (or a wireless channel control station) determines the available frequencies on the basis of the information and the possible available bandwidth about the terminal (3), divides the terminal for each available bandwidth and available frequencies, and performs the grouping process (4). It is also possible to determine the available frequencies by considering the channel load between the frequencies that can be accommodated.

FIG. 7 is substantially the same as FIG. 6, but the available frequency bands and the terminal group are set when a channel is set, and the wireless channel quality of the available frequency bands of each terminal is measured by each terminal in a normal state, and the base station performs the scheduling process on the basis of the reported wireless channel quality, and starts communications. The operation in the normal state is the same as in FIG. 6, and the description is omitted here.

Figure 8:
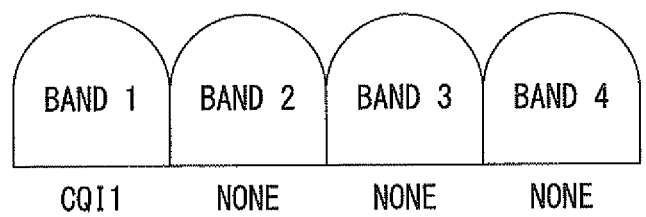
FIG. 8 illustrates an image of measuring wireless channel quality for each available band.

FIG. 8 illustrates an image of measuring wireless channel quality for each available band.

As described above, the terminal for which a terminal group is determined measures the channel quality only for the determined available frequencies, calculate the CQI, and reports the results to the base station.

Thus, the number of CQI reports decreases, thereby reducing the uplink interference.

The base station that has received the CQI classifies the CQI for each group of the terminal, and performs the scheduling process for each terminal group (each available frequency band). Thus, since the number of terminals to be scheduled decreases, the computational complexity in calculating a priority of the terminal in the scheduling process is reduced, thereby speeding up the entire process. Furthermore, since the scheduling process is performed on each terminal group, the entire process can be furthermore sped up by concurrently operating a plurality of schedulers.

Figure 9:
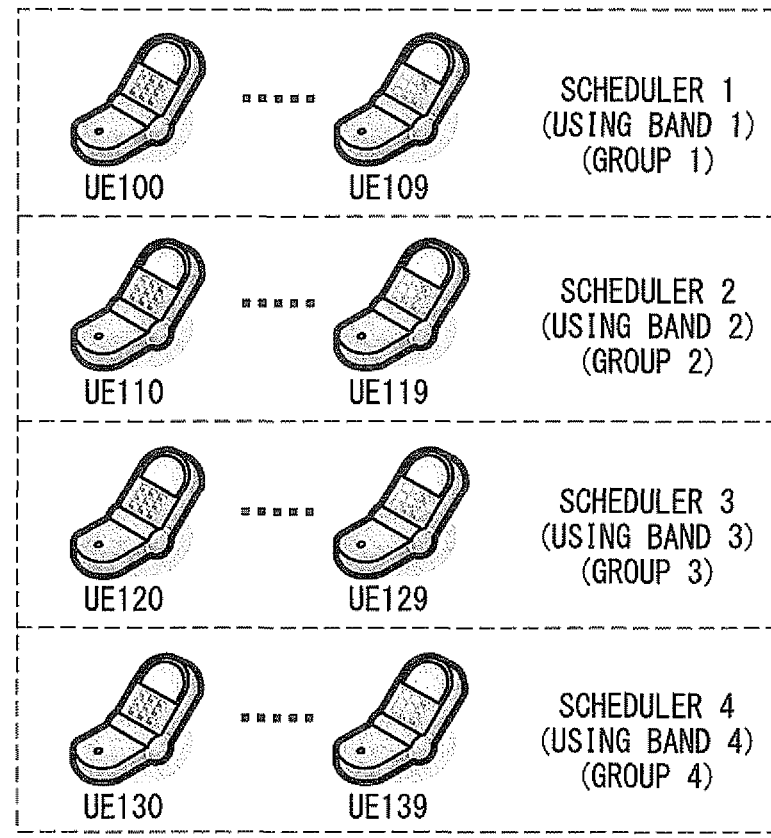
FIG. 9 is an explanatory view (1) of the method of grouping and scheduling a terminal.

FIGS. 9 and 10 are explanatory views of the method of grouping and scheduling a terminal.

In FIGS. 9 and 10, the band of the system is 20 MHz, the available bandwidth of the terminal is 5 MHz, and the terminals UE 100 through 139 are classified into four groups. Using a frequency band 1, a group 1 is scheduled by a scheduler 1 in the four schedulers. Similarly, a group 2 is assigned a band 2 and a scheduler 2, a group 3 is assigned a band 3 and a scheduler 3, and a group 4 is assigned a band 4 and a scheduler 4. They are illustrated by (a) in FIG. 10. Since the data transmission interval is 0.5 ms, the scheduling process of each group is performed every 0.5 ms.

Thus, when a plurality of schedulers are provided, one scheduler is assigned to each terminal group. That is, the group 1 is scheduled by, for example, the scheduler 1, and the group 2 is scheduled by the scheduler 2. The scheduling processes can be concurrently performed as illustrated by (b) in FIG. 10.

FIG. 11 is an explanatory view (1) of an image of grouping and scheduling methods when the available bandwidth of a terminal is different from that illustrated in FIG. 10.

In FIG. 11, the available bandwidth of the terminal is 10 MHz, and there are a group 5 scheduled by a scheduler 5 using bands 1 and 2, and a group 6 scheduled by a scheduler 6 using the bands 3 and 4.

Figure 12:
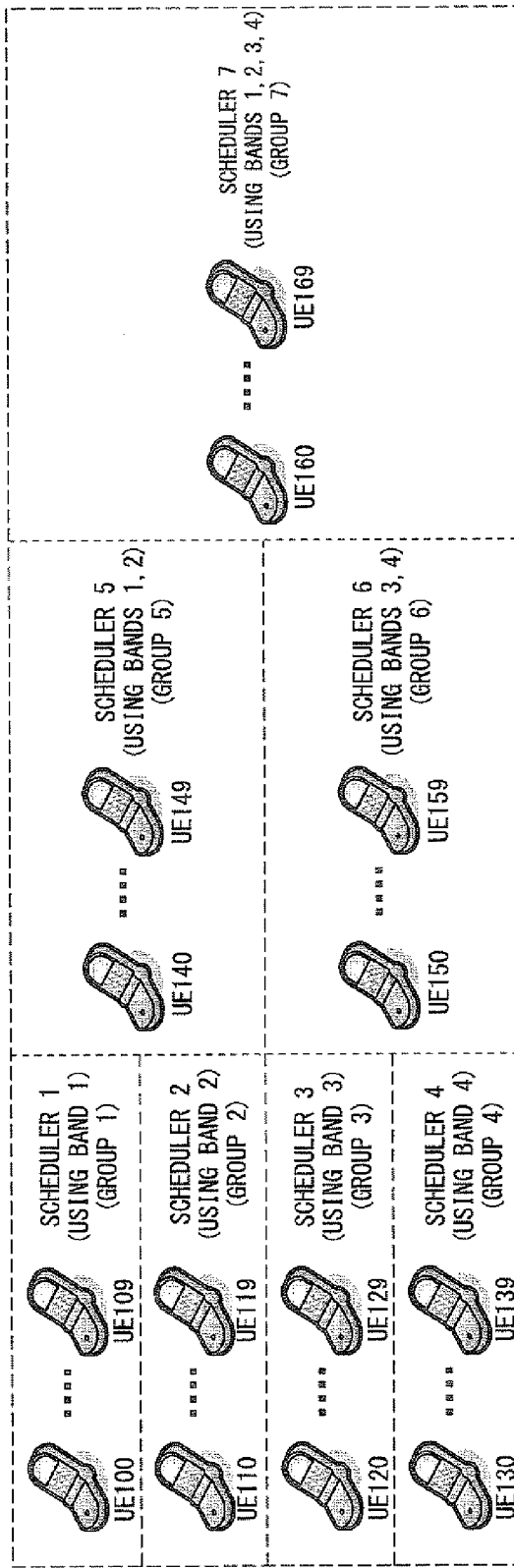
FIG. 12 is an explanatory view (1) of a hierarchical grouping process.

FIGS. 12 and 13 are explanatory view of hierarchical grouping.

As described above, the possible available bandwidth by a terminal depends on the performance of a terminal. Therefore, there can be a method of performing a grouping process on the basis of a possible available bandwidth. In the case illustrated in FIG. 12, the terminals UE 160 through 169 capable of using 20 MHz are classified into a group 7, and scheduled by a scheduler 7. On the other hand, the terminals UE 140 through 149, and the UE 150 through 159 having the available band of 10 MHz are respectively classified into the group 5 scheduled by the scheduler 5 using the bands 1 and 2 and the group 6 scheduled by the scheduler 6 using the bands 3 and 4. The terminals UE 100 through 109, UE 110 through 119, UE 120 through 129, and UE 130 through 139 having the available band of 5 MHz are respectively classified into the group 1 scheduled by the scheduler 1 using the band 1, the group 2 scheduled by the scheduler 2 using the band 2, the group 3 scheduled by the scheduler 3 using the band 3, and the group 4 scheduled by the scheduler 4 using the band 4.

As illustrated by (a) and (b) in FIG. 13, it is assumed that all of the possible available bands are used, and that, for example, a group having a broad loop such as 10 MHz as a possible available band is defined as a higher order group, and a group having a narrow loop such as 5 MHz as a possible available band is defined as a lower order group. At this time, the scheduling process is performed from the higher order group to the lower order group.

As illustrated by (a) in FIG. 13, the group 7 is first scheduled every 0.5 ms as the transmission time of each piece of data, and then the groups 5 and 6, and finally the groups 1 through 4 are scheduled. Part (b) in FIG. 13 illustrates the image of hierarchical scheduling. The scheduling process is performed sequentially and hierarchically from the scheduler 7. Since the two schedulers, that is, the schedulers 5 and 6, and the four schedulers, that is, the schedulers 1 through 4, are concurrently operated, the scheduling processes can be expected to be sped up.

FIG. 14 illustrates an example of a grouping table of a base station when a terminal is grouped.

Corresponding to each terminal group number, the central frequency of the available band of each group, the bandwidth, and the identification number of the terminal belonging to each group is entered.

FIG. 15 is an explanatory view of other grouping methods.

The necessary transmission speed depends on the data to be transmitted. Therefore, the necessary bandwidth depends on the data. That is, QoS may need an available broad bandwidth, or an available narrow bandwidth. Furthermore, if a transmission can be performed by narrowing the bandwidth for the relationship with other terminals although a necessary transmission speed cannot be satisfied, the transmission can be performed. Therefore, when the possible available bandwidth of a terminal is 20 MHz, it cannot only belong to the terminal group of 20 MHz, but also belong to the terminal group of a narrower bandwidth such as 10 MHz, 5 MHz, etc. Therefore, the terminal group is hierarchically defined in the descending order of size of the available bandwidth. In FIG. 15, the terminal having the available band of 20 MHz can perform communications at 10 MHz and 5 MHz. In addition, the terminal having the available band of 10 MHz can also perform communications at 5 MHz. The terminals UE 160 through 169 having the available band of 20 MHz not only belong to the group 7 scheduled by the scheduler 7, but also belong to all groups 1 through 6. Accordingly, when the terminals UE 160 through 169 cannot use the band of 20 MHz, they can be assigned to the group 5 or 6 having the band of 10 MHz. When they cannot also use the band of 10 MHz, they can be assigned to any of the groups 1 through 4 of the band of 5 MHz. Thus, the possibility that the terminals UE 160 through 169 cannot perform communications can be reduced. Similarly, the terminals UE 140 through 149 and UE 150 through 159 having the available band of 10 MHz can also be assigned to the groups 1 through 4 so that communications can also be performed at 5 MHz when the communications cannot be performed at the band of 10 MHz. Since the terminals UE 100 through 109, UE 110 through 119, UE 120 through 129, and UE 130 through 139 belong only to the groups 1 through 4 because there is no available band lower than 5 MHz.

The scheduling process is performed from a higher order group (for example, 20 MHz) to a lower order group (for example, 5 MHz). Thus, the number of terminals to be scheduled in a group can be reduced, and the priority calculating process can also be reduced, thereby speeding up the entire scheduling process.

FIG. 16 illustrates an example of a grouping table of a base station for the grouping operation illustrated in FIG. 15.

The central frequency of the available band of each group, the bandwidth, and the identification numbers of the terminals belonging to each group are entered in the table corresponding to each of the terminal group numbers 1 through 7.

As with the case illustrated in FIG. 14, when a plurality of schedulers are provided, the number of schedulers are to be equal to the number of groups. By providing a scheduler for each group and concurrently and hierarchically operating the plurality of schedulers, the scheduling process can be sped up. In addition, the plurality of schedulers can be replaced with one scheduler capable of performing concurrent operations.

FIGS. 17 through 21 are views of examples of the process when a terminal is grouped.

In the example illustrated in FIG. 17, in step S30, the maximum possible available bandwidth of a target terminal is confirmed. In step S31, the CQI of each band is received from the terminal. In step S32, the available band is selected from the maximum value of the CQI. In step S33, a terminal group corresponding to the selected band is selected.

Figure 18:
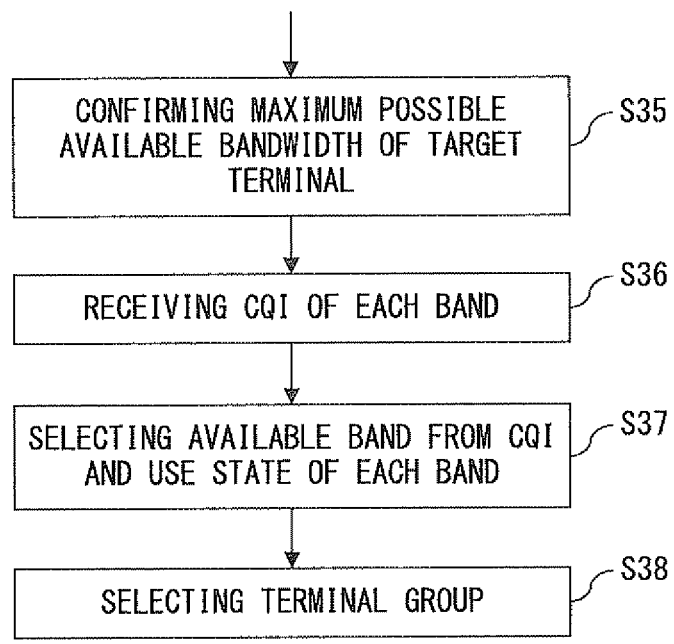
FIG. 18 is a view (2) of an example of the process when a terminal is grouped.

In the example illustrated in FIG. 18, the maximum possible available bandwidth of a target terminal is confirmed in step S35, and the CQI of each band is received in step S36. In step S37, the available band is selected from the CQI and the use state of each band, and in step S38, a terminal group is selected. The use state of each band refers to the number of terminals already assigned to each band, etc. When the number of terminals assigned to a certain band becomes too large, the frequency of the selection by the scheduler is reduced and the transmission speed becomes lower. In this case, performed is the process of selecting the band of the second largest CQI, not the band of the largest CQI, etc.

Figure 19:
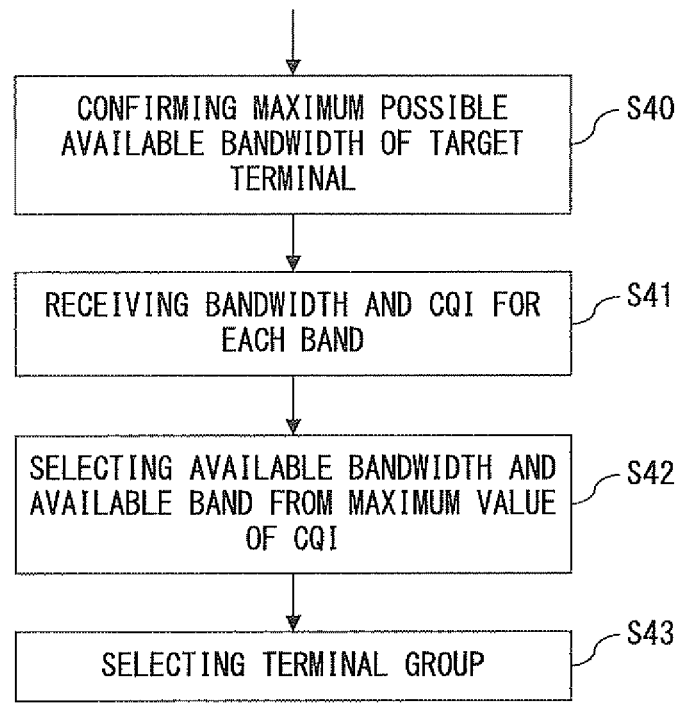
FIG. 19 is a view (3) of an example of the process when a terminal is grouped.

In the example illustrated in FIG. 19, the maximum possible available bandwidth of a target terminal is confirmed in step S40. In step S41, the bandwidth and the CQI for each band are received from the terminal. In step S42, the available bandwidth and the available band are selected from the maximum value of the CQI. In step S43, a terminal group is selected. In FIG. 19, the terminal can use a plurality of available bands. For example, when the system band is 20 MHz and the available band of the terminal is 10 MHz, the terminal can use 10 MHz and 5 MHz. Therefore, the terminal measures the CQIs of two bands having a 10 MHz width and four bands having a 5 MHz, and the base station selects the available band from the measurement results.

Figure 20:
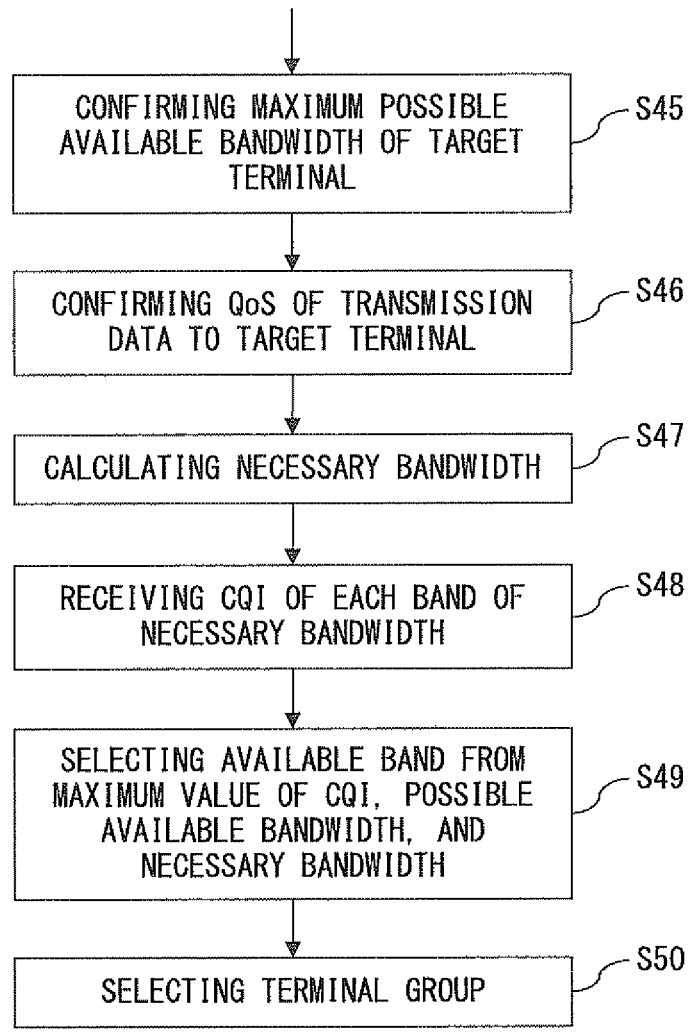
FIG. 20 is a view (4) of an example of the process when a terminal is grouped.

In the example illustrated in FIG. 20, for example, assume the case in which the GBR (guaranteed bit rate) of the QoS is set. That is, assume the case in which a service of the regulated lowest transmission speed is set. For example, assume that the possible transmission speed is 3 Mbps with the band of 5 MHz, the modulation system of the QPSK, and at the coding rate of 1/3. At this time, when the GBR of a terminal is 5 Mbps, it is necessary to have the bandwidth of 10 MHz to satisfy the GBR. Therefore, the terminal is assigned to the group having the available bandwidth of 10 MHz. The modulation system can be a QPSK, and a multivalue modulation system of 16 QAM, 64 QAM, etc., the coding rate can be variable, and the MIMO function can be used.

In step S45, the maximum possible available bandwidth of a target terminal is confirmed. In step S46, the QoS of transmission data to the target terminal is confirmed. In step S47, the necessary bandwidth is calculated. In step S48, the CQI for each band of the necessary bandwidth is received from the terminal. In step S49, the available bandwidth is selected from the maximum value of the CQI, the possible available bandwidth, and the necessary bandwidth. In step S50, a terminal group is selected.

Figure 21:
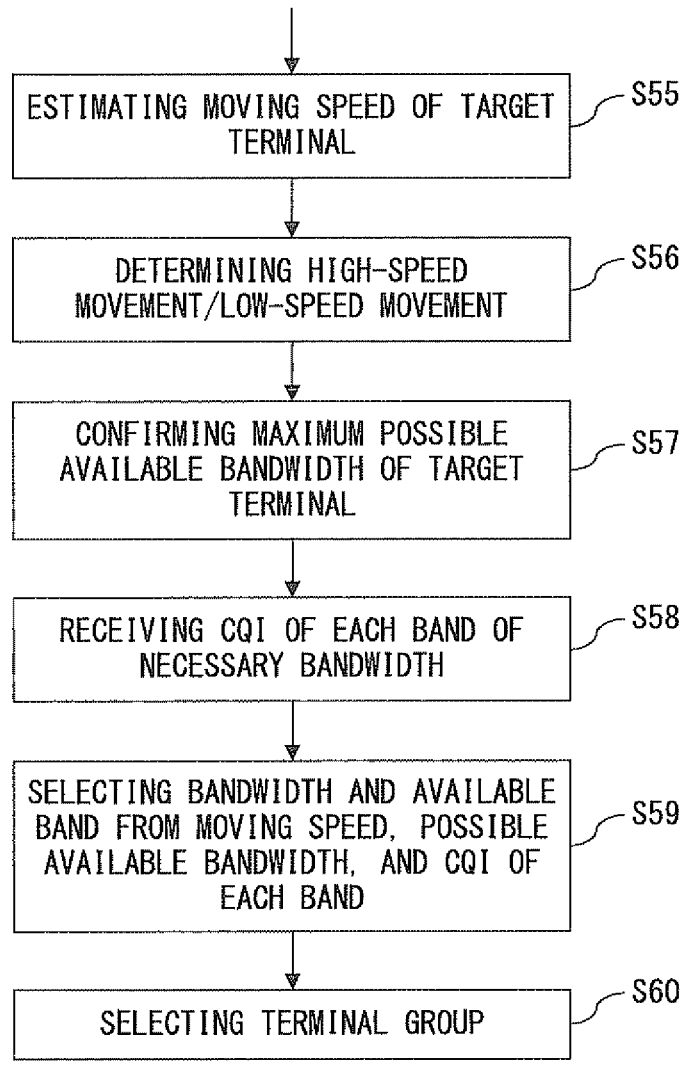
FIG. 21 is a view (5) of an example of the process when a terminal is grouped.

In the example illustrated in FIG. 21, the degradation of the transmission characteristic by the movement of a terminal is considered. That is, the Doppler frequency is determined by the moving speed of the terminal, and the level of the degradation of the transmission characteristic is determined by the Doppler frequency. Since the Doppler frequency is enhanced with increasing available frequencies, it is desired to use a lower frequency in the communications with the terminal to correspond to a high-speed movement.

Then, for example, when the system bandwidth is 20 MHz, and the central frequency is f1<f2<f3<f4 in FIG. 14, a higher frequency band (central frequencies f3, f4, and f6) is defined for a high-speed movement terminal while a lower frequency band (f1, f2, and f5) is defined for a low-speed movement or suspended terminal.

Prior to grouping a terminal, the terminal or the base station estimates the moving speed of the terminal. An estimating method can be realized by, for example, measuring the interval (fading pitch) of a drop of the intensity of a reception electric field by fading. The result is compared with the threshold of the moving speed, a high-speed movement is determined when the moving speed is higher, and a low-speed movement or a suspended state is determined when the moving speed is lower.

In step S55, the moving speed of a target terminal is estimated. In step S56, a high-speed movement/low-speed movement is determined. In step S57, the maximum possible available bandwidth of a target terminal is confirmed. In step S58, the CQI of each band of a necessary bandwidth is received from the terminal. In step S59, a bandwidth and a available band are selected from the moving speed, the possible available bandwidth, and the CQI of each band. In step S60, a terminal group is selected.

Figure 23:
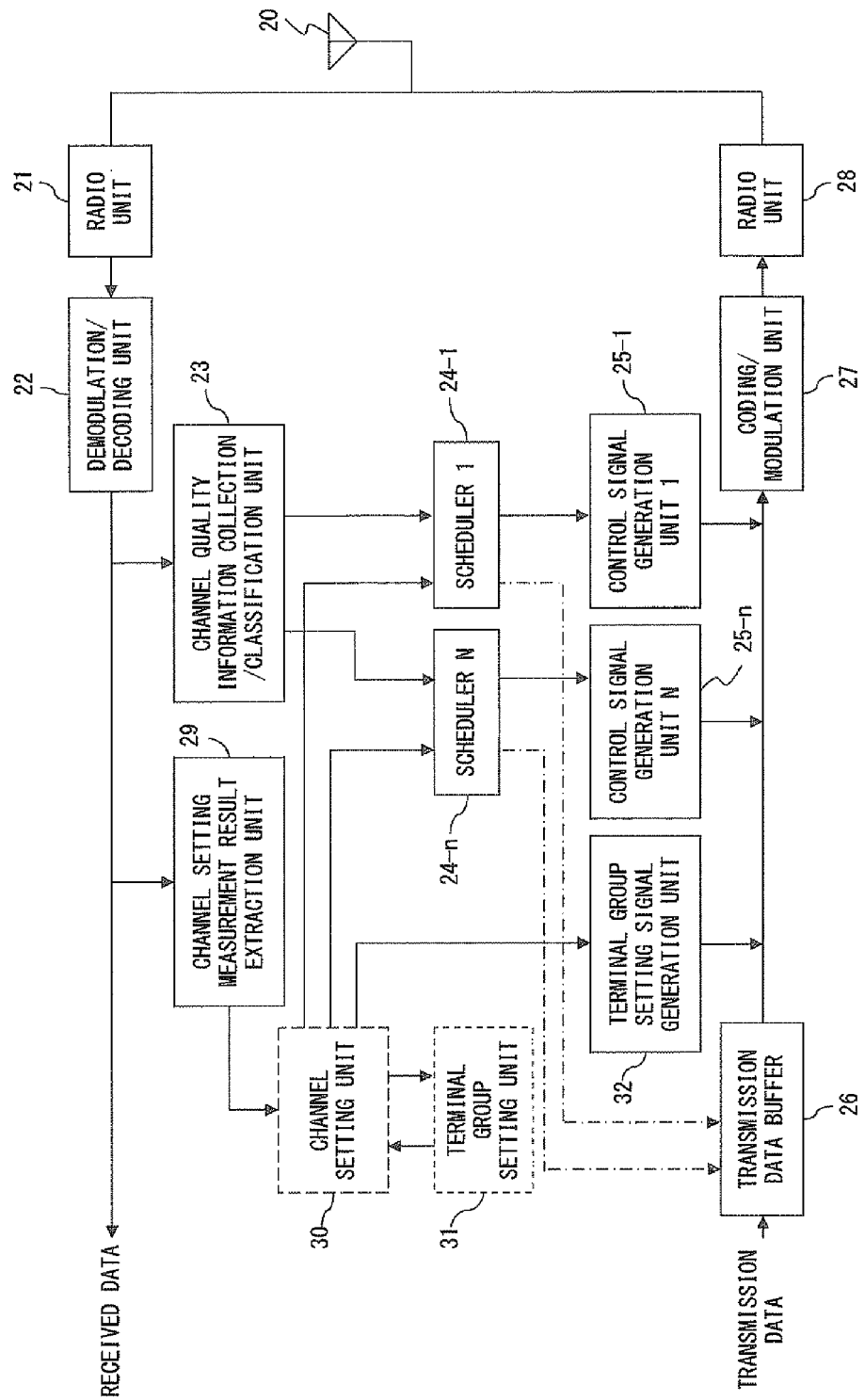
FIG. 23 is a view illustrating the configuration of the principle of the base station according to the present invention.

FIG. 22 is a view of the configuration illustrating the principle of the terminal according to the present invention. FIG. 23 is a view illustrating the configuration of the principle of the base station according to the present invention. In FIG. 22, a component corresponding to that in FIG. 1 is assigned the same reference numeral. In FIG. 23, a component corresponding to that in FIG. 2 is assigned the same reference numeral.

In the downlink transmission of the wireless communication system using a plurality of bands in the OFDMA system such as the E3G etc. and the MC-CDMA system etc., when a terminal receives a downlink control signal (for example, a pilot signal) when a channel is set through the antenna 10, the radio unit 11, and the demodulation/decoding unit 12, and measures and calculates the wireless channel quality of each band by the wireless channel quality measurement unit 13, and notifies the base station using an uplink wireless channel through the channel quality transmission unit 14, the coding/modulation unit 15, the radio unit 16, and the antenna 10.

In the base station that receives the wireless channel quality of each band, a channel setting measurement result extraction unit 29 extracts the wireless channel quality etc. of each band measured by a terminal, and provides it for a channel setting unit 30. The channel setting unit 30 refers to the information about the terminal of a terminal group setting unit 31, considers the possible available bandwidth of the terminal, the use state and the load of the band, determines the band used by the terminal, groups the terminal by the available band, and notifies the terminal of the result through a terminal group setting signal generation unit 32.

Upon receipt of the notification, the terminal allows a terminal group setting information extraction unit 17 to extract the information, sets the frequency band etc. of the terminal group to which the terminal is assigned on the radio units 11 and 16 and the channel quality measurement unit 13 through a terminal setting control unit 18. Afterwards, the channel quality of the available band is periodically measured by the channel quality measurement unit 13, calculates the channel quality indicator, and reports the result to the base station through the uplink wireless channel.

When the base station allows the channel quality information collection/classification unit 23 to receive the wireless channel quality indicator from each terminal classifies the wireless channel quality indicator for each group to which the terminal belongs, and calculates the transmission priority on the basis of the wireless channel quality indicator for each group using schedulers 24-1 through 24-n. At this time, a scheduler of the schedulers 24-1 through 24-n is selected for taking charge of the terminal group to which the terminal that has transmitted the channel quality information belongs, and calculates the transmission priority. In FIG. 23, only two schedulers are illustrated, but generally n schedulers can be provided, and it is effective when the number of schedulers is equal to the number of terminal groups.

A transmission terminal is selected on the basis of the priority calculation result, a transmitting method (for example, the amount of transmission data, a modulation system, a coding rate, etc.) is selected, a transmission control signal is generated by control signal generation units 25-1 through 25-n on the basis of the selection result, and the signal is transmitted to the terminal that transmits data. After the transmission control signal, transmission data is coded in the determined transmitting method, modulated, and then transmitted to the terminal. With the possible available bandwidth of the terminal and the possible available modulation system taken into account, a transmitting method is selected. Furthermore, by limiting the possible available modulation system for each group (for each scheduler), the transmitting method selecting process can be more easily performed.

The terminal allows a control signal extraction unit 19 to extract the transmission control signal transmitted from the base station, interprets the contents of the signal, and makes necessary settings in receiving data on the demodulation/decoding unit 12. After the settings, the data transmitted from the base station is received.

As described above, the following processes can be performed by grouping terminals on the basis of the available bands.

1) The wireless channel quality is measured only for the available band, the wireless channel quality indicator is calculated, and the result is reported to the base station.
2) The scheduling process is performed or each group, the priority is calculated, the transmitting terminal is selected, and the transmitting method is determined.

As described above, the following effect can be obtained. The measurement of the wireless channel quality can be reduced on the unused bands. That is, the process can be easily performed. In addition, the number of reports of the wireless channel quality indicator to the base station can be reduced. Thus, the transmitting process at the terminal can be reduced, and the number of reports can be decreased, thereby reducing the wave interference with the up-channel.

Furthermore, since the scheduling process can be performed for each group, the number of terminals to be scheduled can be reduced, and the processing time required to calculate the priority etc. can be shortened. In addition, by performing the scheduling process for each group, the scheduling processes can be concurrently performed, and the processing time required to calculate the priority etc. can be shortened.

In the example of the configuration of the base station illustrated in FIG. 23, the channel setting unit 30 and the terminal group setting unit 31 enclosed by the doted lines can be provided for the wireless channel control station (RNC) as an upper-stream device of the base station.

In the descriptions above, the terminals are grouped when a channel is set, but the grouping process can be changed at predetermined intervals or for adjustment of the number of accommodated terminals in the corresponding bands (that is, a negative load). In this case, for example, the process can be performed in the procedure illustrated in FIG. 6.

Figure 25:
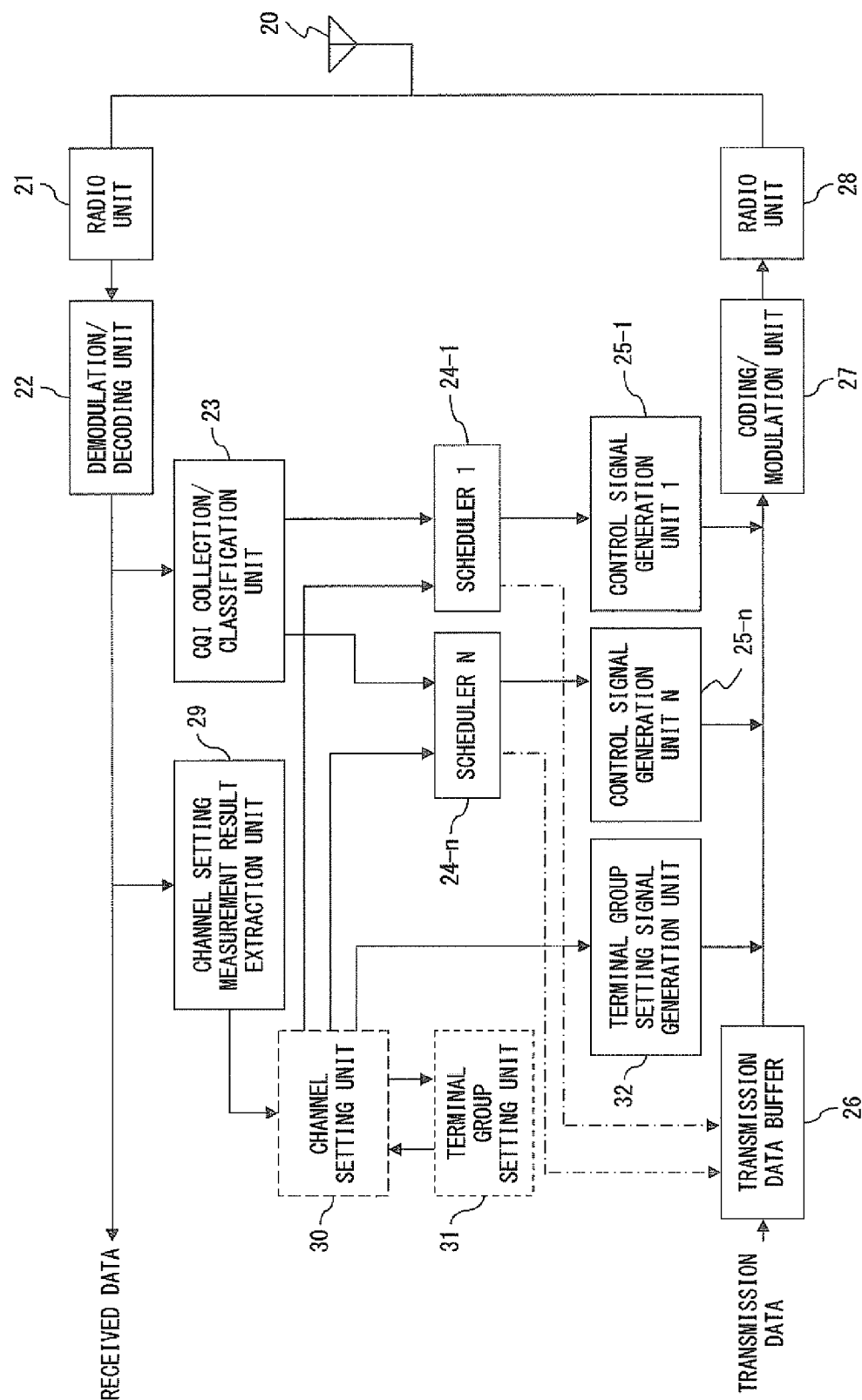
FIG. 25 illustrates an example of a configuration illustrated in FIG. 23 applied to a case when a CQI is measured on as wireless channel quality.

FIG. 24 illustrates an example of a configuration illustrated in FIG. 22 applied to a case when a CQI is measured as wireless channel quality. FIG. 25 illustrates an example of a configuration illustrated in FIG. 23 applied to a case when a CQI is measured as wireless channel quality.

The CQI measurement/calculation unit illustrated in FIG. 24 measures and calculates the CQI only for the frequency band used by the related terminal group after it is determined which terminal group the related terminal belongs. The necessary settings are performed by the terminal setting control unit 18. The CQI collection/classification unit 23 illustrated in FIG. 25 measures the CQI relating to the available frequency bands of the terminal group to which the terminal belongs, and collects the calculation value. The obtained CQI value is passed to the scheduler for managing the scheduling of the corresponding terminal group.

Figure 26:
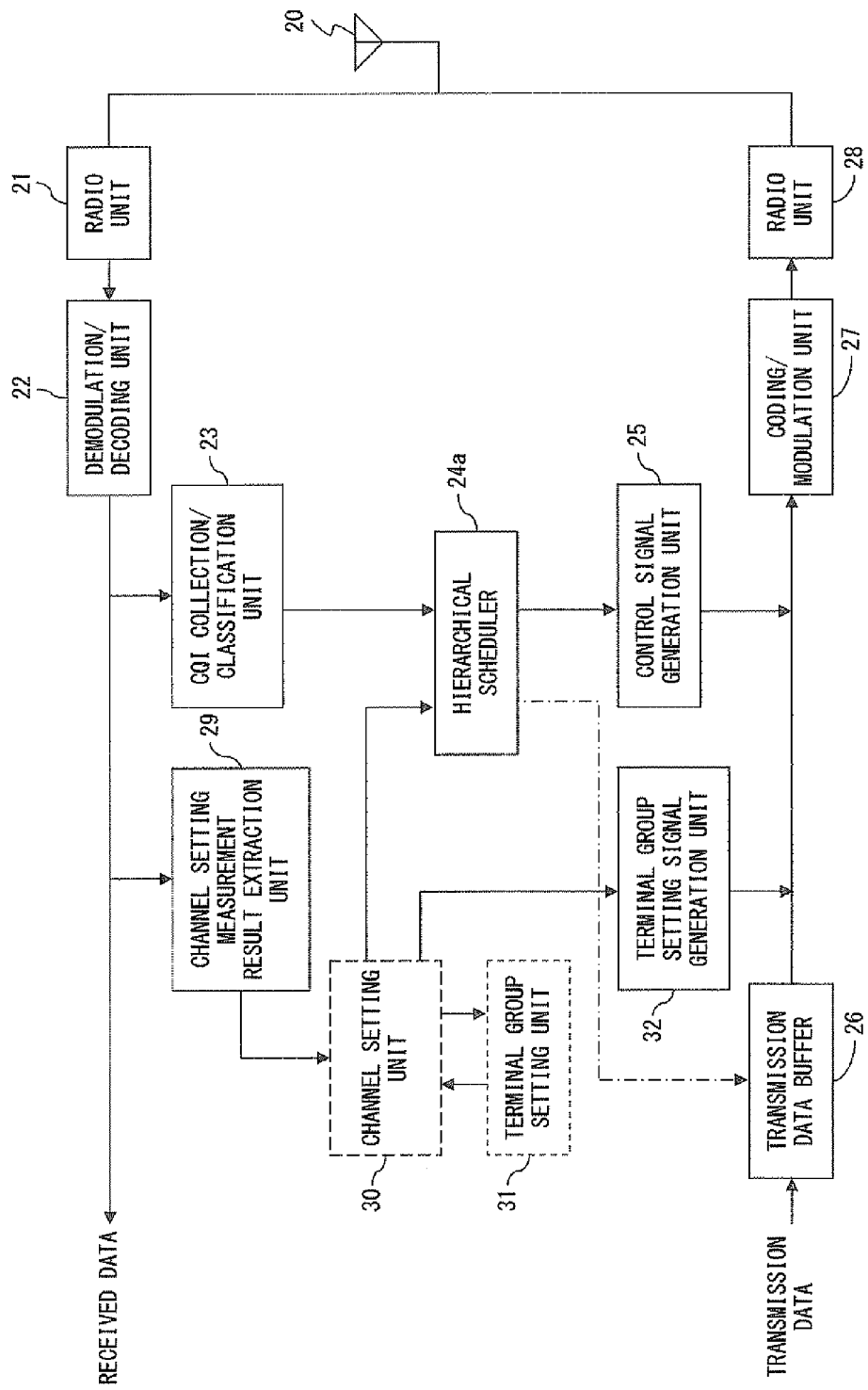
FIG. 26 illustrates the second example of a configuration of a base station according to an embodiment of the present invention.

FIG. 26 illustrates the second example of a configuration of a base station according to an embodiment of the present invention.

In FIG. 26, a component corresponding to that illustrated in FIG. 23 is assigned the same reference numeral.

In the example of the configuration above, the grouping process is performed with the possible available bandwidth of the terminal taken into account. In this example, the possible available band of a terminal is 20 MHz, and one divided band is 5 MHz. The terminal belongs to the group of the available band of 20 MHz. However, depending on the data to be transmitted, the requested transmission speed may not require the bandwidth of 20 MHz. In this case, the available bandwidth of 20 MHz is not efficient. However, in the group for which the available bandwidth is fixed, the available band is 20 MHz.

Then, assume that the terminal belongs to possible multiple groups of the bandwidths of 20 MHz, 10 MHz, and 5 MHz. Since the terminal can belong to the groups having different available central frequencies, the terminal can belong to seven groups. In this case, when a broad bandwidth is used, and when a transmitting terminal is selected, the scheduling process is to be performed in the descending order of the available bandwidths. By hierarchically arranging the groups in the descending order of available bandwidths, a broad band can be easily used. In addition, when a broad band is used, it is desired that consecutive bands are selected, but the consecutive bands can be more easily used by the hierarchical configuration above.

When the hierarchical grouping is performed, different schedulers are not assigned to each terminal group, but it is performed by providing one hierarchical scheduler 24a capable of performing a concurrent calculation.

Figure 28:
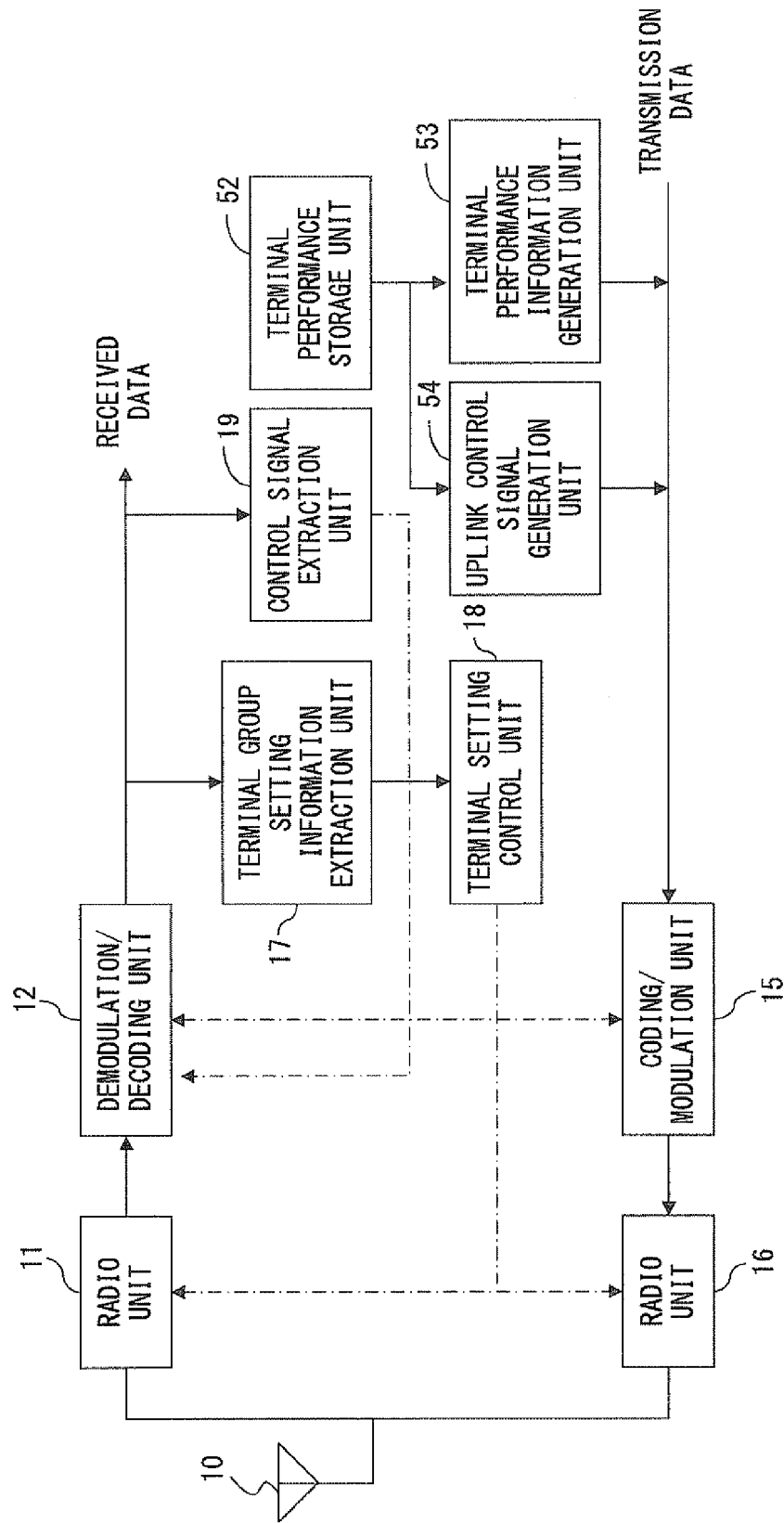
FIG. 28 illustrates the second example of a configuration of a terminal according to an embodiment of the present invention corresponding to FIG. 27.

FIG. 27 illustrates the third example of a configuration of a base station according to an embodiment of the present invention. FIG. 28 illustrates the second example of a configuration of a terminal according to an embodiment of the present invention corresponding to FIG. 27. In FIG. 27, the component corresponding to that in FIG. 23 is assigned the same reference numeral. In FIG. 28, the component corresponding to that in FIG. 22 is assigned the same reference numeral.

In this example, an uplink transmission is described as an example, but an available frequency band can be selected using uplink wireless channel quality for a downlink transmission.

A terminal performance information generation unit 53 generates terminal performance information on the basis of the terminal performance stored in a terminal performance storage unit 52, and the terminal transmits a control signal (for example, a pilot signal) generated by an uplink control signal generation unit 54 according to the information about the possible available band as the terminal performance.

The base station measures the reception power of the control signal (for example, a pilot signal) transmitted from the terminal using each band in a CQI measurement/calculation unit 50 during channel setting, a terminal performance information extraction unit 51 extracts a result obtained by calculating the wireless channel quality of each band and the possible available bandwidth of the terminal, they are provided for the channel setting unit 30, a group to which the corresponding terminal belongs is selected, and the terminal is notified of the result.

Upon receipt of the notification, the terminal allows the terminal group setting information extraction unit 17 to extract group information, the terminal setting control unit 18 to set devices such as the radio units 11 and 16, and then performs an uplink data transmission using the bands.

On the other hand, the base station allows the wireless channel quality indicator collection unit 23 to measure and calculate the uplink wireless channel quality only on the bands of the group to which the terminal belongs, and performs the scheduling process on the basis of the results of the measurement and the calculation. A terminal is selected on the basis of the priority calculated in the scheduling process, an uplink transmitting method is selected, and the selected terminal is notified of the results. The notification is extracted by the control signal extraction unit 19 of the terminal, and set by the demodulation/decoding unit 12.

Figure 29:
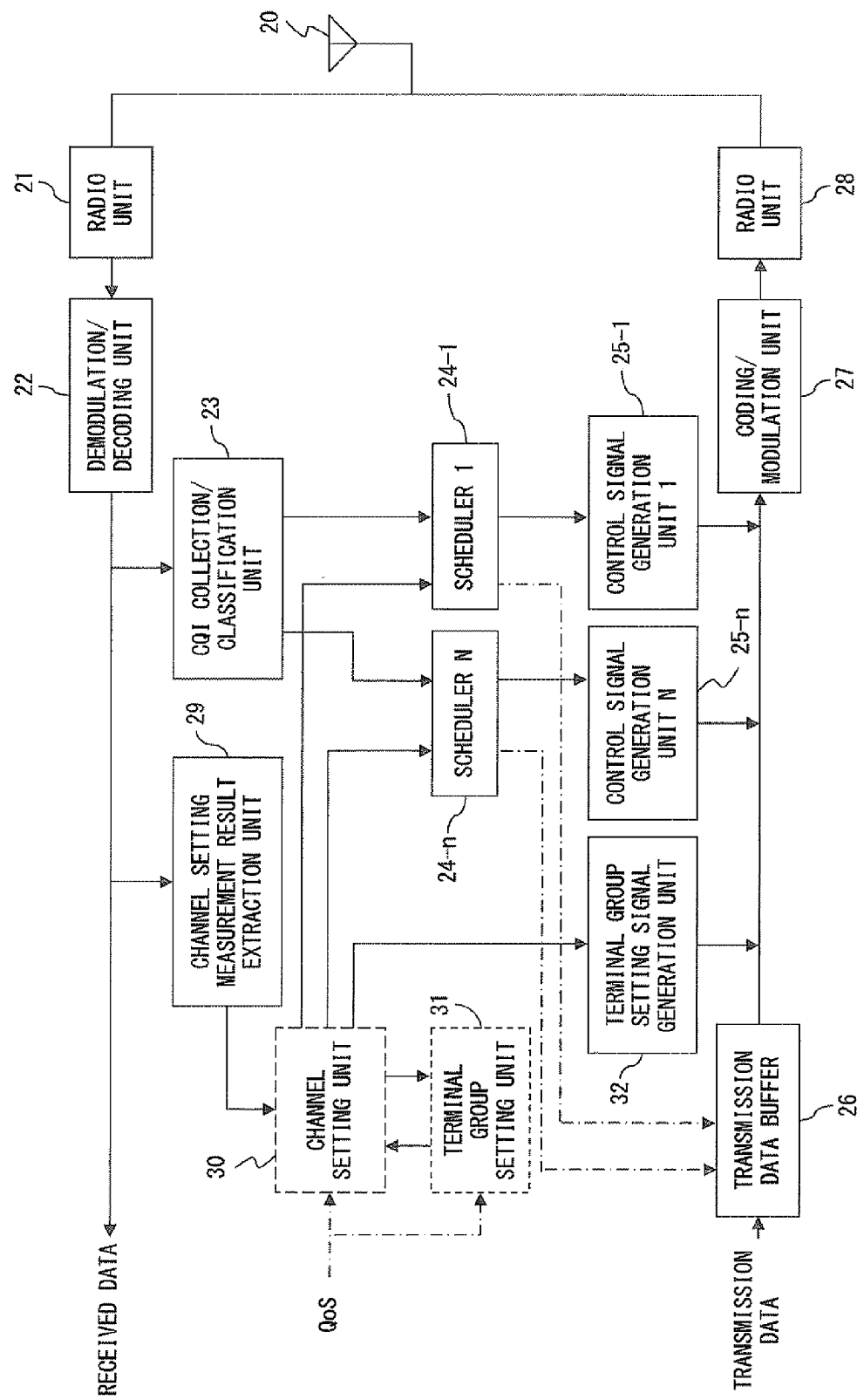
FIG. 29 illustrates the fourth example of a configuration of a base station according to an embodiment of the present invention.

FIG. 29 illustrates the fourth example of a configuration of a base station according to an embodiment of the present invention. In FIG. 29, the component corresponding to that in FIG. 23 is assigned the same reference numeral.

With the above-mentioned configuration, a terminal is grouped by the wireless channel quality of each band and the possible available bandwidth. However, in this example, since the terminal is grouped with the QoS (quality of service) of the transmission data taken into account. Since the QoS is predetermined (for example, during channel setting) when the base station communicates with the terminal, and the base station is informed of the QoS in advance when it communicates with the terminal, it inputs the information to the channel setting unit 30 and the terminal group setting unit 31 to consider the terminal in the grouping process.

Figure 30:
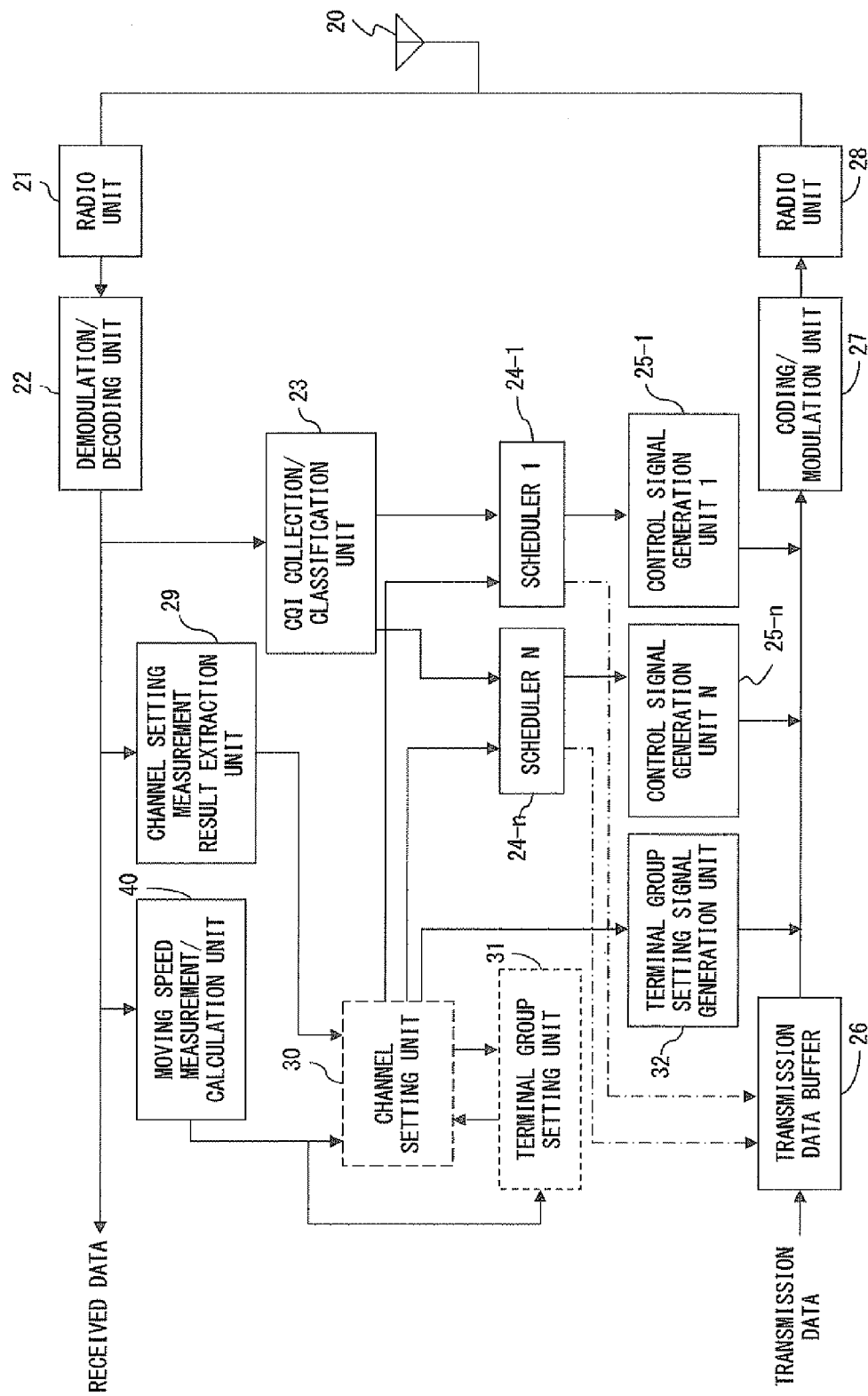
FIG. 30 illustrates the fifth example of a configuration of a base station according to an embodiment of the present invention.

FIG. 30 illustrates the fifth example of a configuration of a base station according to an embodiment of the present invention. In FIG. 30, the component corresponding to that in FIG. 23 is assigned the same reference numeral.

With the above-mentioned configuration, a terminal is grouped using the wireless channel quality of each band and the possible available bandwidth of the terminal. However, in this example, the grouping process is performed with the moving speed of the terminal taken into account. In the base station, for example, a moving speed measurement/calculation unit 40 measures the control signal (for example, a pilot signal) transmitted from the terminal and the reception power of data, and calculates the moving speed (or the relative speed between the terminal and the base station) of the terminal on the basis of the measurement result. In the terminal group setting unit 31 or the channel setting unit 30, the measured and calculated speed of the terminal is compared with the speed threshold stored in the terminal group setting unit 31 of the channel setting unit 30. If it is equal to or exceeds the threshold, then it is determined that the terminal is moving at a high speed, an available bandwidth and an available frequency are selected, and a terminal group is selected. The speed threshold can be externally stored for the terminal group setting unit 31 and the channel setting unit 30.

As described above, according to the present invention, a terminal is grouped for each available frequency, and scheduled for group, thereby reducing the number of target terminals to be scheduled, concurrently performing the scheduling processes, and shortening the processing time for the scheduling processes.

In addition, since the wireless channel quality can be measured only for the available frequency band, the measuring process can be reduced. Furthermore, since the number of reports of the wireless channel quality can be reduced, the interference power can be successfully reduced.

What is claimed is:

1. A wireless communication system having a base station communicating with a plurality of subordinate terminals using a plurality of frequency bands, comprising:
   a controller configured to assign the plurality of subordinate terminals to a group, the group corresponds to one or more frequency bands of the plurality of frequency bands used in a multiple access, the assignment of each terminal of the plurality of subordinate terminals to the group is based on a performance capability of each terminal to utilize a bandwidth of the one or more frequency bands corresponding to the group;
   a scheduler configured to schedule a terminal assigned to the group; and
   a transmitter configured to communicate with the terminal according to a result of the scheduling.

2. The system according to claim 1, wherein
   the terminal is assigned hierarchically depending on a level of a bandwidth of a frequency band used by the terminal to schedule the terminal in a descending order of a hierarchical structure of terminal groups.

3. The system according to claim 1 or 2, wherein
   the terminal can belong to multiple groups.

4. The system according to claim 1, wherein
   the base station can measure wireless channel quality only on a frequency band of a group to which the terminal to communicate with belongs.

5. The system according to claim 1, wherein
   the terminal can measure wireless channel quality only on a frequency band of a group to which the terminal belongs.

6. The system according to claim 5, wherein
   a wireless channel quality indicator is acquired by calculating measured wireless channel quality, and the indicator is transmitted to the base station.

7. The system according to claim 1, wherein
   the terminal calculates wireless channel quality from reception power of a control signal transmitted from the base station during channel setting, and transmits a result to the base station; and
   the base station assigns the terminal on the basis of the received wireless channel quality, and notifies the terminal of the group to which the terminal belongs.

8. The system according to claim 1, wherein
   the base station calculates wireless channel quality from reception power of a signal transmitted from the terminal during channel setting, assigns the terminal on the basis of the wireless channel quality, and notifies the terminal of the group to which the terminal belongs.

9. The system according to claim 1, wherein
   the terminal is assigned with possible available frequency bandwidth of each terminal of the plurality of subordinate terminals further taken into account.

10. The system according to claim 1, wherein
    the terminal is assigned with service quality information about transmission data further taken into account.

11. The system according to claim 1, wherein
    the terminal is assigned with a measurement value of a moving speed of the terminal further taken into account.

12. The system according to claim 1, wherein
    a modulation system and a coding rate for use in communications are set for each group corresponding to one or more of the plurality of frequency bands.

13. The system according to claim 1, wherein
    the scheduler comprises a plurality of schedulers taking charge of scheduling of respective groups.

14. A wireless communication method in which a base station communicates with a plurality of subordinate terminals using a plurality of frequency bands, comprising:
    assigning the plurality of subordinate terminals to a group, the group corresponds to one or more frequency bands of the plurality of frequency bands used in a multiple access, the assignment of each terminal of the plurality of subordinate terminals to the group is based on a performance capability of each terminal to utilize a bandwidth of the one or more frequency bands corresponding to the group;
    scheduling a terminal assigned to the group; and
    communicating, by the base station, with the terminal according to a result of the scheduling.

15. A wireless communication system having a base station communicating with a plurality of subordinate terminals using a plurality of frequency bands, comprising:
    a controller configured to assign the plurality of subordinate terminals to a group, the group corresponds to one or more frequency bands of the plurality of frequency bands used in a multiple access, the assignment of each terminal of the plurality of subordinate terminals to the group is based on a performance capability of each terminal to utilize a bandwidth of the one or more frequency bands corresponding to the group.

16. A wireless communication system having a base station communicating with a plurality of subordinate terminals using a plurality of frequency bands, comprising:
    a controller configured to assign the plurality of subordinate terminals to a group, the group corresponds to one or more frequency bands of the plurality of frequency bands used in a multiple access, the assignment of each terminal of the plurality of subordinate terminals to the group is based on a performance capability of each terminal to utilize a bandwidth of the one or more frequency bands corresponding to the group;
    a scheduler configured to schedule a terminal assigned to the group; and
    a transmitter for a terminal configured to communicate with the base station according to a result of the scheduling.

17. A base station communicating with a plurality of subordinate terminals using a plurality of frequency bands, comprising:
    a controller configured to assign the plurality of subordinate terminals to a group, the group corresponds to one or more frequency bands of the plurality of frequency bands, the assignment of each terminal of the plurality of subordinate terminals to the group is based on a performance capability of each terminal to utilize a bandwidth of the one or more frequency bands corresponding to the group;
a scheduler configured to schedule a terminal assigned to the group; and
a transmitter configured to communicate with the terminal according to a result of the scheduling.

18. The base station according to claim 17, wherein the base station assigns the terminal on the basis of received wireless channel quality, and notifies the terminal of the group to which the terminal belongs.

19. The base station according to claim 17, wherein the base station calculates wireless channel quality from reception power of a signal received from the terminal during channel setting, assigns the terminal on the basis of the wireless channel quality, and notifies the terminal of the group to which the terminal belongs.

* * * * *